(12) United States Patent
Kim et al.

(10) Patent No.: US 11,102,687 B2
(45) Date of Patent: Aug. 24, 2021

(54) METHOD AND APPARATUS FOR PERFORMING HANDOVER IN WIRELESS COMMUNICATION SYSTEM

(71) Applicant: SAMSUNG ELECTRONICS CO., LTD., Suwon-si (KR)

(72) Inventors: Dong Gun Kim, Suwon-si (KR); Seung Ri Jin, Suwon-si (KR); Soeng Hun Kim, Suwon-si (KR); Alexander Sayenko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 16/413,199

(22) Filed: May 15, 2019

(65) Prior Publication Data

US 2019/0268819 A1  Aug. 29, 2019

Related U.S. Application Data

(63) Continuation of application No. PCT/KR2018/013553, filed on Nov. 8, 2018.

(30) Foreign Application Priority Data

Nov. 9, 2017 (KR) .................. 10-2017-0148448

(51) Int. Cl.
*H04W 36/08* (2009.01)
*H04W 36/00* (2009.01)
*H04W 36/14* (2009.01)
*H04W 72/04* (2009.01)
*H04W 72/12* (2009.01)
*H04W 24/10* (2009.01)
*H04W 88/06* (2009.01)
*H04W 36/30* (2009.01)
*H04W 84/04* (2009.01)

(52) U.S. Cl.
CPC .......... *H04W 36/08* (2013.01); *H04W 24/10* (2013.01); *H04W 36/0085* (2018.08); *H04W 36/14* (2013.01); *H04W 36/30* (2013.01); *H04W 72/04* (2013.01); *H04W 72/12* (2013.01); *H04W 88/06* (2013.01); *H04W 84/042* (2013.01)

(58) Field of Classification Search
CPC . H04W 24/10; H04W 36/30; H04W 36/0083; H04W 36/00835; H04W 36/0058; H04W 36/0085; H04W 36/14; H04W 88/06; H04W 88/10; H04W 36/0022
See application file for complete search history.

(56) References Cited

U.S. PATENT DOCUMENTS 9,414,286 B1 * 8/2016 Oroskar ............ H04W 36/0083
2006/0166694 A1 * 7/2006 Jeong .................... H04W 48/16
455/525

(Continued)

FOREIGN PATENT DOCUMENTS

KR  10-2018-0137135 A  12/2018

OTHER PUBLICATIONS

Author Unknown, Consideration on CN type indication, Doc. No. R2-1708151, Aug. 25, 2017 (Year: 2017).*

(Continued)

*Primary Examiner* — Christopher M Crutchfield
(74) *Attorney, Agent, or Firm* — Sughrue Mion, PLLC

(57) ABSTRACT

Disclosed is a 5G or a pre-5G communication system provided to support a higher data transmission rate than a system after a 4G communication system such as LTE.

16 Claims, 22 Drawing Sheets

(56) References Cited

U.S. PATENT DOCUMENTS

| | | | | |
|---|---|---|---|---|
| 2011/0105123 A1* | 5/2011 | Lee | .................. | H04W 24/10 |
| | | | | 455/436 |
| 2013/0308481 A1 | 11/2013 | Kazmi et al. | | |
| 2013/0329694 A1 | 12/2013 | Vrzic et al. | | |
| 2015/0031371 A1* | 1/2015 | Zhao | ................ | H04W 36/0058 |
| | | | | 455/439 |
| 2015/0264608 A1 | 9/2015 | Hole et al. | | |
| 2015/0264738 A1 | 9/2015 | Lee et al. | | |
| 2015/0289153 A1 | 10/2015 | Gopal et al. | | |
| 2015/0327144 A1* | 11/2015 | Dalsgaard | ............ | H04W 48/18 |
| | | | | 370/252 |
| 2018/0368016 A1* | 12/2018 | Lee | ...................... | H04B 17/318 |
| 2019/0059045 A1* | 2/2019 | Huang-Fu | ............. | H04W 36/08 |
| 2019/0349825 A1* | 11/2019 | Tseng | ................... | H04W 48/20 |
| 2020/0045590 A1* | 2/2020 | Wu | ......................... | H04W 8/08 |

OTHER PUBLICATIONS

Author Unknown, Mobility issue in LTE connected to NextGen Core, Doc. No. R2-1708436 Aug. 25, 2017 (Year: 2017).*
Author Unknown, CN selection for E-UTRAN connected to 5G CN, Doc. No. R2-1707749, Aug. 25, 2017 (Year: 2017).*
Author Unknown, Considerations on LTE connectivity to 5G-CN, Doc. No. R2-1707785, Aug. 25, 201 (Year: 2017).*
Author Unknown, CN selection when accessing, Doc. No. R2-1707796, Aug. 25, 2017 (Year: 2017).*
Author Unknown, CN Type Selection in LTE Connectivity to 5G-CN, Doc. No. R2-1708245, Aug. 25, 2017 (Year: 2017).*
Written Opinion (PCT/ISA/237) issued by the International Searching Authority in corresponding International Application No. PCT/KR2018/013553, dated Feb. 14, 2019.
International Search Report (PCT/ISA/210), issued by International Searching Authority in corresponding International Application No. PCT/KR2018/013553, dated Feb. 14, 2019.
Catt, "CN Type Selection in LTE Connectivity to 5G-CN", 3GPP TSG RAN WG2, Meeting #99, Berlin, DE, R2-1708245, XP051318146, Aug. 20, 2017, pp. 1-3.
Communication dated Dec. 16, 2019 issued by the European Patent Office in counterpart European Application No. 18875806.4.

* cited by examiner

METHOD AND APPARATUS FOR PERFORMING HANDOVER IN WIRELESS COMMUNICATION SYSTEM

PRIORITY

This application is continuation of International Application No. PCT/KR2018/013553, which was filed on Nov. 8, 2018, and claims priority to Korean Patent Application No. 10-2017-0148448, which was filed on Nov. 9, 2017, the contents of which are incorporated herein by reference.

TECHNICAL FIELD

The disclosure generally relates to a method and an apparatus for performing handover in a wireless communication system.

BACKGROUND

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, implantation of the 5G communication system in an mmWave band has been considered. In the 5G communication system, technologies such as beamforming, massive MIMO, Full Dimensional MIMO (FD-MIMO), an array antenna, analog beam-forming, and a large scale antenna are discussed to mitigate a propagation path loss in the mmWave band and increase a propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

SUMMARY

The disclosure provides a method and an apparatus for making a request for transmission resources for data transmission by a UE in a wireless communication system.

The disclosure provides a method and an apparatus for efficiently selecting a core network for handover in a next-generation mobile communication system.

The disclosure provides a method and an apparatus for making a request for handover and scheduling in order to support an additional uplink frequency in a next-generation mobile communication system.

The disclosure provides a method and an apparatus for preventing a frequent scheduling request in a wireless communication system.

The disclosure provides a method and an apparatus for performing intra-frequency measurement or inter-frequency measurement in a next-generation mobile communication system.

The disclosure provides a method and an apparatus for, when the UE makes a request for transmission resources to transmit data and the eNB establishes a plurality of scheduling request resources in response thereto in a wireless communication system, preventing abuse of the corresponding scheduling request resources.

The disclosure provides a method and an apparatus for measuring radio resources by the UE based on synchronization signals for intra-frequency measurement or inter-frequency measurement newly defined in a next-generation mobile communication system.

The disclosure provides a method and an apparatus for configuring intra-frequency measurement or inter-frequency measurement in consideration of not only carrier frequency information of synchronization signals which the UE desires to measure but also subcarrier intervals.

The disclosure provides a method and an apparatus by which a source eNB selects a cell of a target eNB connected to a particular core network and hands over the UE when the UE performs handover from the source eNB to the target eNB.

The disclosure provides a method and an apparatus by which the UE makes a request for resources through a plurality of scheduling requests according to traffic characteristics and transmission resource request causes, receives uplink resources at a proper time, and transmits data.

The disclosure provides a method and an apparatus for intra-frequency or inter-frequency measurement and handover newly defined in a next-generation mobile communication system.

The disclosure provides a method and an apparatus for determining an operation in which the eNB and the UE support intra-frequency or inter-frequency mobility.

The disclosure provides a method and an apparatus in which the UE which can be connected to a 5G CN (NR core network) or an EPC (LTE network) may determine that a cell of a target eNB connected to the EPC or the 5G CN is a source eNB for handover as necessary in a next-generation mobile communication system.

The disclosure provides a method and an apparatus for specifying a core network selection or reselection process in handover, and move to an EPC so as to receive functions or services which are not supported by the 5G CN or move to a 5G CN so as to receive functions or services which are not supported by the EPC.

In accordance with an aspect of the disclosure, a method of a User Equipment (UE) in a wireless communication system is provided. The method includes: receiving measurement configuration information from a first evolved Node B (eNB); performing cell measurement based on the measurement configuration information; and reporting result information of the performed cell measurement to the first eNB, wherein the result information includes a core network type of the cell.

In accordance with another aspect of the disclosure, a method of a first evolved Node B (eNB) in a wireless communication system is provided. The method includes: transmitting measurement configuration information to a User Equipment (UE); and receiving result information of cell measurement performed based on the measurement configuration information from the UE, wherein the result information includes a core network type of the cell.

In accordance with another aspect of the disclosure, a User Equipment (UE) in a wireless communication system is provided. The UE includes: a transceiver; and a controller configured to control the transceiver, wherein the controller receives measurement configuration information from a first evolved Node B (eNB), performs cell measurement, based on the measurement configuration information, and reports result information of the performed cell measurement to the first eNB, and the result information includes a core network type of the cell.

In accordance with another aspect of the disclosure, an evolved Node B (eNB) in a wireless communication system is provided. The eNB includes: a transceiver; and a controller configured to control the transceiver, wherein the controller transmits measurement configuration information to a UE and receives result information of cell measurement performed based on the measurement configuration information from the UE, and the result information includes a core network type of the cell.

According to the disclosure, a UE which can be connected to a 5G CN (NR core network) or an EPC (LTE network) can determine that a cell of a target eNB connected to the EPC or the 5G CN is a source eNB for handover as necessary in a next-generation mobile communication system.

According to the disclosure, it is possible to specify a core network selection or reselection process, and move to an EPC so as to receive functions or services which are not supported by the 5G CN or move to a 5G CN so as to receive functions or services which are not supported by the EPC.

DETAILED DESCRIPTION

Hereinafter, the operating principle of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the following description, terms for identifying an access node, terms referring to network entities, terms referring to messages, terms referring to interfaces between network entities, and terms referring to various pieces of identification information are used for convenience of description. Accordingly, the disclosure is not limited to the following terms and other terms having the same technical meaning may be used.

For convenience of description, the disclosure uses terms and names defined in a 3rd-Generation Partnership Project, Long-Term Evolution (3GPP LTE) standard or terms and names changed on the basis thereof. However, the disclosure may not be limited by the terms and names, and may be equally applied to a system that is based on another standard. Particularly, the disclosure may be applied to 3GPP New Radio (NR, $5^{th}$-generation mobile communication standard).

Figure 1:
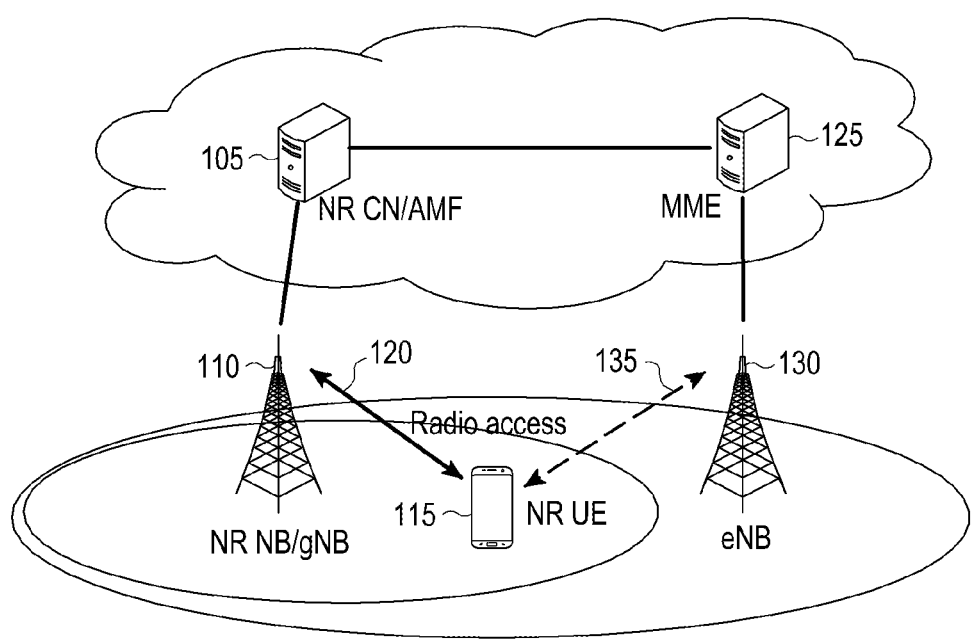
FIG. 1 illustrates a structure of a next-generation mobile communication system.

FIG. 1 illustrates a structure of a next-generation mobile communication system.

Referring to FIG. 1, a radio access network of a next-generation mobile communication system (New Radio: NR) includes a new radio node B 110 (hereinafter, referred to as an NR NB, an NR gNB, or a gNB) and a new radio core network 105 (hereinafter, referred to as a NG CN, a Next Generation Core Network (NG CN), or an AMF). A new radio user equipment 115 (hereinafter, referred to an NR UE, a UE, or a terminal) accesses an external network through the gNB 110 and the AMF 105.

The gNB corresponds to an evolved Node B (hereinafter, referred to as an eNB) of the conventional LTE system. The gNB may be connected to the NR UE through a radio channel and may provide better service than the conventional node B as indicated by reference numeral 120.

In the next-generation mobile communication system, all user traffic is served through a shared channel. Accordingly, a device for collecting and scheduling status information such as buffer statuses, available transmission power statuses, and channel statuses of UEs is needed, which is served by the gNB 110. One gNB generally controls a plurality of cells. The next-generation mobile communication system may have a maximum bandwidth wider than or equal to the conventional maximum bandwidth in order to implement super-high data transmission compared to conventional LTE.

The next-generation mobile communication system uses an Orthogonal Frequency Division Multiplexing (OFDM) as radio access technology and may additionally use a beam-forming technique. Further, the next-generation mobile communication system applies a modulation scheme and an Adaptive Modulation and Coding (hereinafter, referred to as an AMC) scheme of determining a channel coding rate in correspondence to a channel status of the UE.

The AMF 105 performs a function of supporting mobility, establishing a bearer, and configuring Quality of Service (QoS). The AMF is a device for performing a function of managing mobility of the UE and various control functions and is connected to a plurality of eNBs.

Further, the next-generation mobile communication system may interwork with the conventional LTE system, and the AMF is connected to a Mobility Management Entity (MME) 125 through a network interface. The MME is connected to the eNB 130, which is a conventional eNB. The UE supporting LTE-NT dual connectivity may transmit and receive data while maintaining the connection not only to the gNB but also to the eNB as indicated by reference numeral 135.

Figure 2:
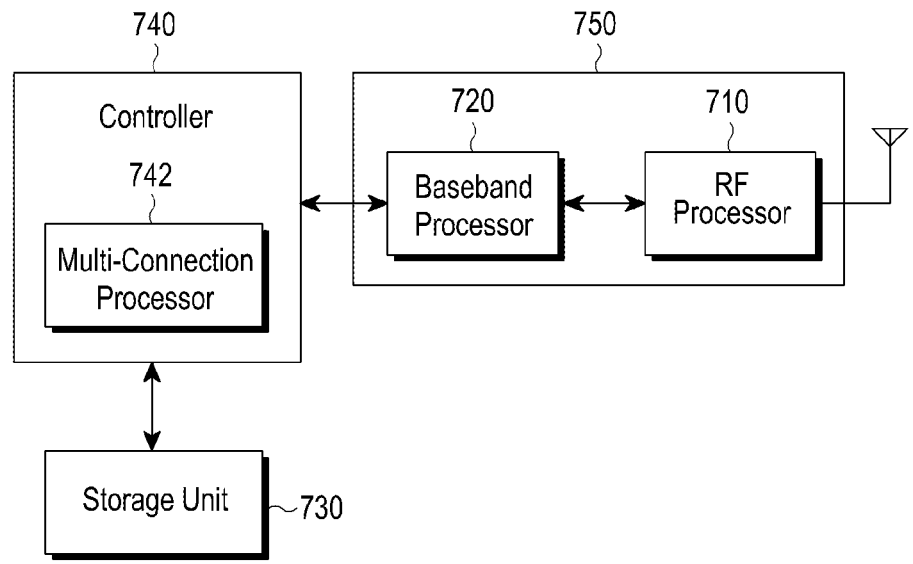
FIG. 2 is a block diagram illustrating an internal structure of a UE.

FIG. 2 is a block diagram illustrating the UE according to the disclosure.

Referring to FIG. 2, the UE may include a transceiver 750 and a controller 740 and may further include a storage unit 730. The transceiver 750 may include a Radio Frequency (RF) processor 710 and a baseband processor 720.

The RF processor 710 performs a function for transmitting and receiving a signal through a wireless channel, such as band conversion and amplification of a signal. That is, the RF processor 710 up-converts a baseband signal provided from the baseband processor 720 into an RF band signal, transmits the RF band signal through an antenna, and then down-converts the RF band signal received through the antenna into a baseband signal.

Figure 7:
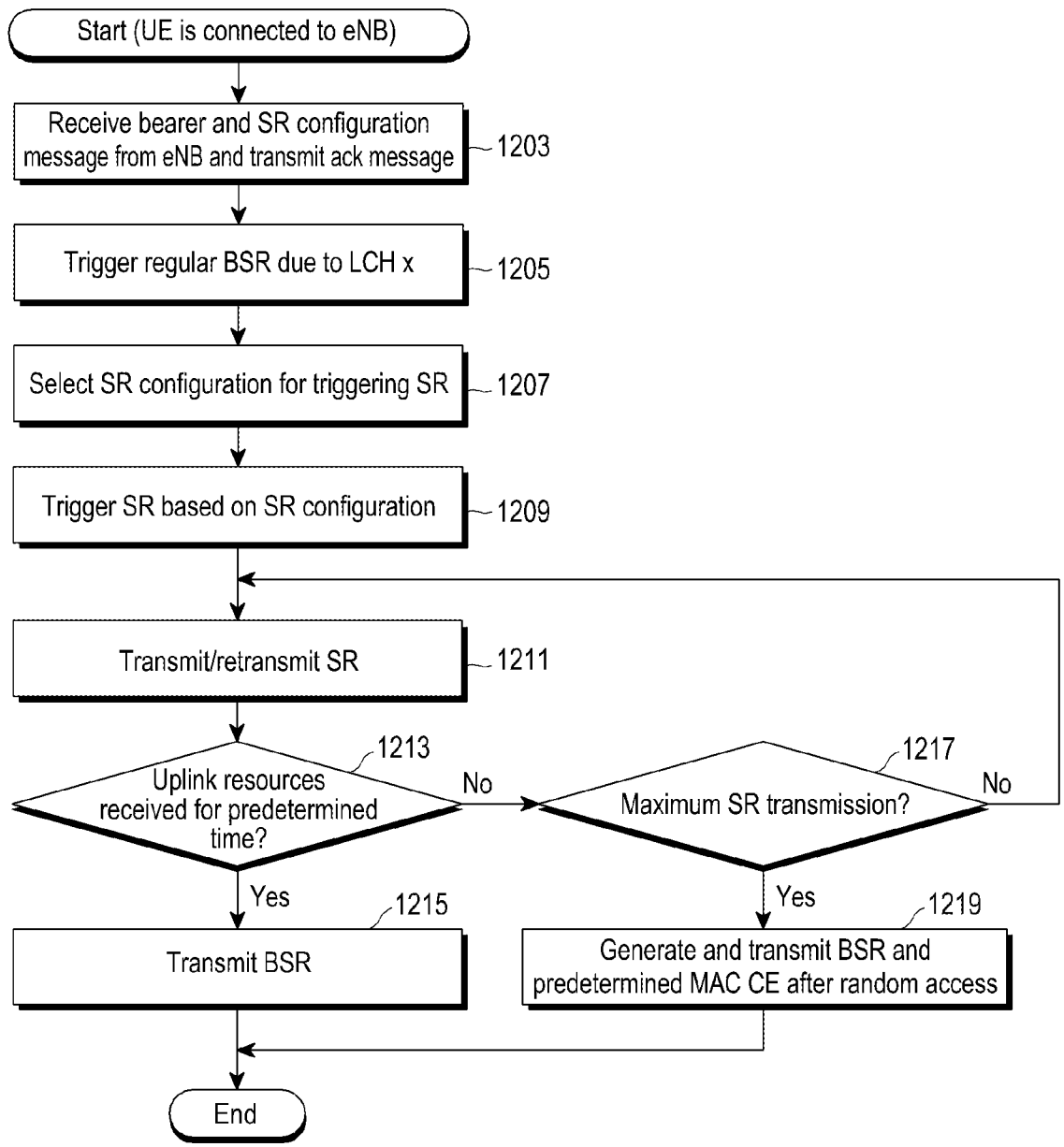
FIG. 7 illustrates a first embodiment of operation flow of the UE according to a method of transmitting a scheduling request.

For example, the RF processor 710 may include a transmission filter, a reception filter, an amplifier, a mixer, an oscillator, a digital-to-analog convertor (DAC), an analog-to-digital convertor (ADC), and the like. Although only one antenna is illustrated in FIG. 7, the UE may include a plurality of antennas.

The RF processor 710 may include a plurality of RF chains. Moreover, the RF processor 710 may perform beam-forming. For the beamforming, the RF processor 710 may control a phase and a size of each signal transmitted/received through a plurality of antennas or antenna elements. The RF processor may perform MIMO and receive a plurality of layers when performing the MIMO operation.

The baseband processor 720 performs a function for a conversion between a baseband signal and a bitstream according to a physical layer standard of the system. For example, when data is transmitted, the baseband processor 720 generates complex symbols by encoding and modulating a transmission bitstream. Further, when data is received, the baseband processor 720 reconstructs a reception bitstream by demodulating and decoding a baseband signal provided from the RF processor 710. In an OFDM (orthogonal frequency division multiplexing) scheme, when data is transmitted, the baseband processor 720 generates complex symbols by encoding and modulating a transmission bitstream, mapping the complex symbols to subcarriers, and then configures OFDM symbols through an IFFT (inverse fast Fourier transform) operation and a CP (cyclic prefix) insertion. When data is received, the baseband processor 720 divides the baseband signal provided from the processor 710 in the unit of OFDM symbols, reconstructs the signals mapped to the subcarriers through an FFT (fast Fourier transform) operation, and then reconstructs a reception bitstream through demodulation and decoding.

The baseband processor 720 and the RF processor 710 transmit and receive signals as described above. Accordingly, the baseband processor 720 and the RF processor 710 may be referred to as a transmitter, a receiver, a transceiver, or a communication unit.

At least one of the baseband processor 720 and the RF processor 710 may include a plurality of communication modules to support a plurality of different radio access technologies. In addition, at least one of the baseband processor 720 and the RF processor 710 may include different communication modules to process signals of different frequency bands. The different radio access technologies may include a WLAN (for example, IEEE 802.11) and a cellular network (for example, LTE). The different frequency bands may include a super-high-frequency (SHF) (for example, 2 NRHz, NRhz) band and a millimeter (mm) wave (for example, 60 GHz) band.

The storage unit 730 stores data such as a basic program, an application, and setting information for the operation of the UE. The storage unit 730 may store information related to a second access node for performing wireless communication through second radio access technology. The storage unit 730 provides the stored data according to a request from the controller 740.

The controller 740 controls the overall operation of the UE. The controller 740 transmits and receives signals through the baseband processor 720 and the RF processor 710. The controller 740 records data in the storage unit 740 and reads the data. To this end, the controller 740 may include at least one processor. For example, the controller 740 may include a CP (communication processor) that performs a control for communication, and an AP (application processor) that controls a higher layer such as an application program.

The controller 740 includes a multi-connection processor 742 for processing the operation in a multi-connection mode. For example, the controller 740 may control the UE to perform a procedure of the operation of the UE illustrated in FIG. 2.

According to an embodiment of the disclosure, the UE may receive measurement configuration information from the eNB, perform cell measurement on the basis of the measurement configuration information, and report result information of the performed measurement to the eNB, and the result information may include a core network type of the cell.

Figure 3:
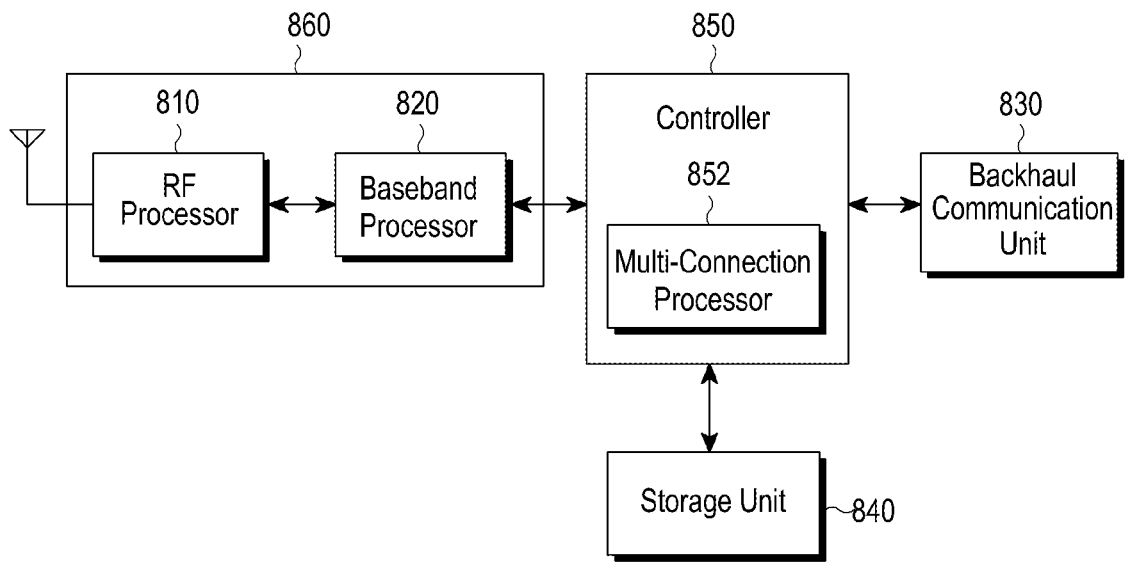
FIG. 3 is a block diagram illustrating a configuration of an eNB.

FIG. 3 is a block diagram illustrating a master eNB in a wireless communication system according to an embodiment of the disclosure.

Referring to FIG. 3, the eNB may include a transceiver 860 and a controller 850 and may further include a storage unit 840. The eNB may further include a backhaul communication unit 830 unlike the UE. The transceiver 860 includes an RF processor 810 and a baseband processor 820.

The RF processor 810 performs a function for transmitting and receiving a signal through a wireless channel, such as band conversion and amplification of a signal. That is, the RF processor 810 up-converts a baseband signal provided from the baseband processor 820 into an RF band signal and then transmits the converted signal through an antenna, and down-converts an RF band signal received through the antenna into a baseband signal. For example, the RF processor 810 may include a transmission filter, a reception filter, an amplifier, a mixer, an oscillator, a DAC, and an ADC.

Although only one antenna is illustrated in FIG. 3, the first access node may include a plurality of antennas. The RF processor 810 may include a plurality of RF chains. The RF processor 810 may perform beamforming. For the beamforming, the RF processor 810 may control a phase and a size of each of the signals transmitted and received through a plurality of antennas or antenna elements. The RF processor may perform a downlink MIMO operation by transmitting one or more layers.

The baseband processor 820 performs a function of performing conversion between a baseband signal and a bitstream according to a physical layer standard of the first radio access technology. For example, when data is transmitted, the baseband processor 820 generates complex symbols by encoding and modulating a transmission bitstream. Further, when data is received, the baseband processor 820 reconstructs a reception bitstream by demodulating and decoding a baseband signal provided from the RF processor 810.

In an OFDM scheme, when data is transmitted, the baseband processor 820 may generate complex symbols by encoding and modulating the transmission bitstream, map the complex symbols to subcarriers, and then configure OFDM symbols through an IFFT operation and CP insertion. In addition, when data is received, the baseband processor 820 divides a baseband signal provided from the RF processor 810 in units of OFDM symbols, recovers signals mapped with sub-carriers through an FFT operation, and then recovers a reception bit string through demodulation and decoding.

The baseband processor 820 and the RF processor 810 transmit and receive signals as described above. Accordingly, the baseband processor 820 and the RF processor 810 may be referred to as a transmitter, a receiver, a transceiver, or a communication unit.

The backhaul communication unit 830 provides an interface for communicating with other nodes within the network. The backhaul communication unit 830 converts a bitstream transmitted from the master eNB to another node, for example, a secondary eNB or a core network into a physical signal and a physical signal received from the other node into a bitstream.

The storage unit 840 stores data such as a basic program, an application, and setting information for the operation of the master eNB. The storage unit 840 may store information on a bearer allocated to the accessed UE and the measurement result reported from the accessed UE. Further, the storage unit 840 may provide multiple connections to the UE and store information on a reference for determining whether to stop the multiple connections. In addition, the storage unit 840 provides the stored data according to a request from the controller 850.

The controller 850 controls the overall operation of the master eNB. The controller 850 transmits and receives signals through the baseband processor 820 and the RF processor 810 or through the backhaul communication unit 830. The controller 850 may record data in the storage unit 840 and read the data. To this end, the controller 850 may include at least one processor.

According to an embodiment of the disclosure, the eNB may transmit measurement configuration information to the UE and receive result information of cell measurement performed on the basis of the measurement configuration information from the UE, and the result information may include a core network type of the cell.

Figure 4:
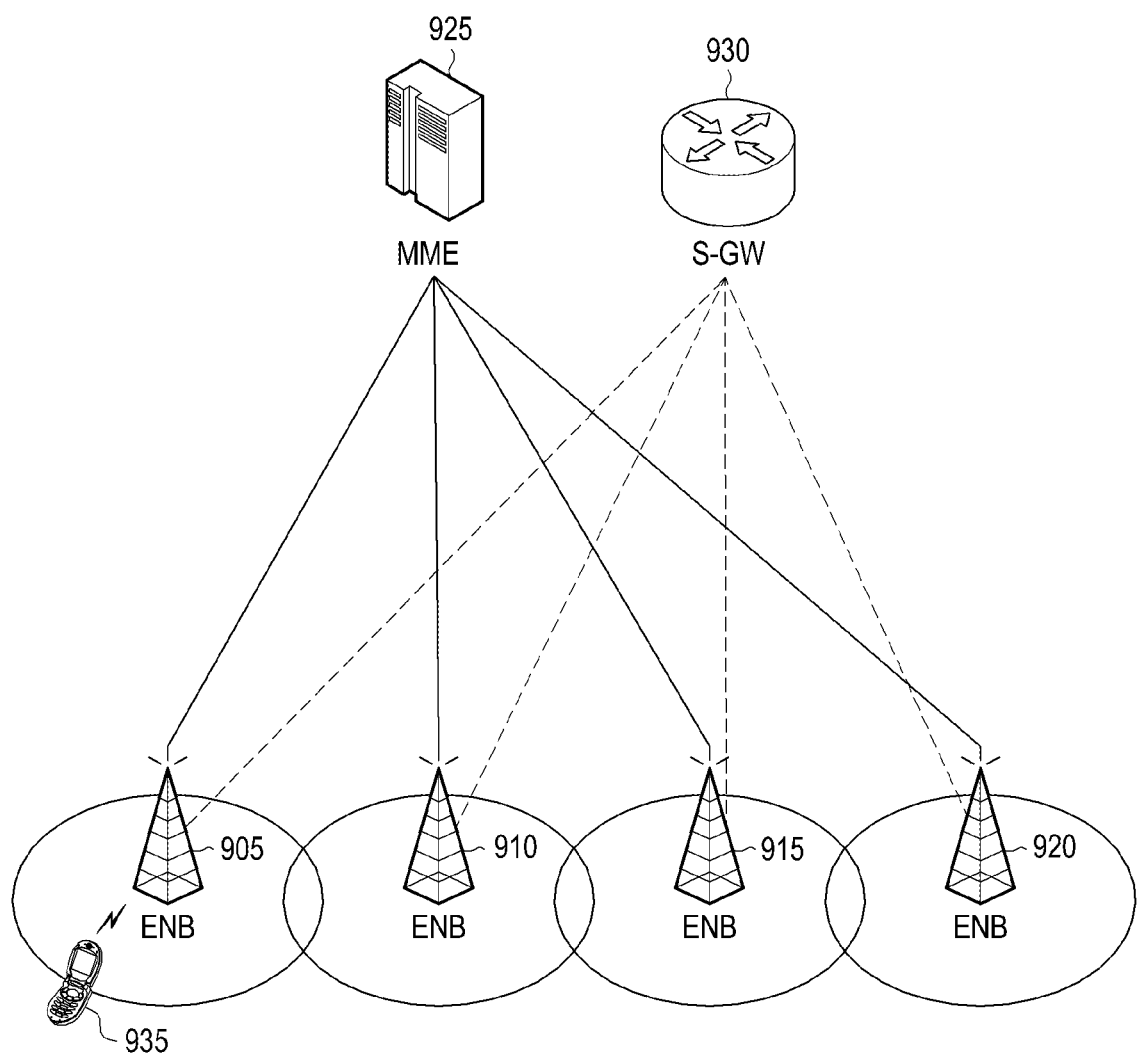
FIG. 4 illustrates a structure of an LTE system.

FIG. 4 illustrates a structure of the LTE system.

Referring to FIG. 4, the wireless communication system may include a plurality of evolved Node B (eNBs) (or base stations) 905, 910, 915, and 920, a Mobility Management Entity (MME) 920, and a Serving-Gateway (S-GW) 930. A User Equipment (UE) (or a terminal) 935 may access an external network through the eNBs and the S-GW 930.

The eNBs 905, 910, 915, and 920 provide radio access to UEs which access the network as access nodes of the cellular network. That is, in order to serve traffic of users, the eNBs 905, 910, 915, and 920 collect and schedule status information such as buffer statuses, available transmission power statuses, and channel statuses of UEs and support connection between the UEs and a Core Network (CN).

The MME 925 is a device performing a function of managing mobility of the UE and various control functions and is connected to a plurality of eNBs, and the S-GW 930 is a device providing a data bearer. The MME 925 and the S-GW 930 may further perform authentication of the UE accessing the network and management of the bearer, and processes packets received from the eNB or packets transmitted from the eNB.

Figure 5:
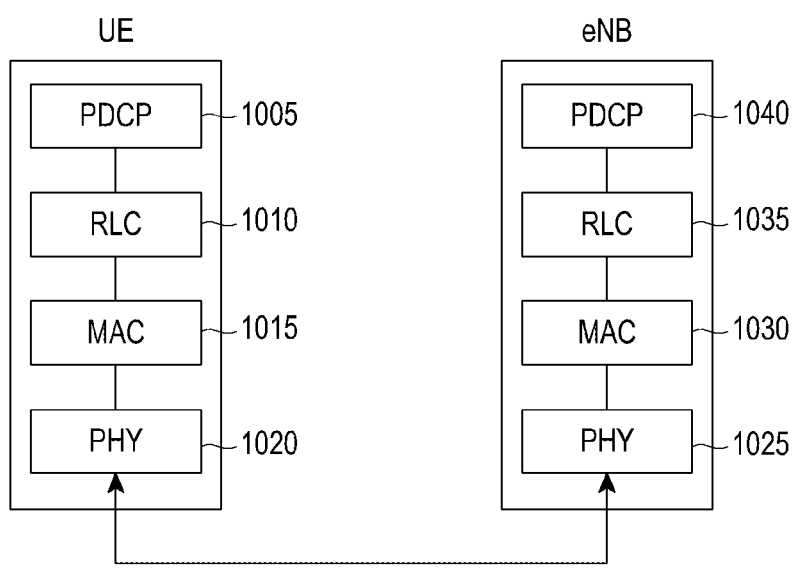
FIG. 5 illustrates a structure of a wireless protocol of the LTE system.

FIG. 5 illustrates a structure of a wireless protocol in the LTE system. A structure of a wireless protocol of NR may be partially different from the structure of the wireless protocol of FIG. 10.

Referring to FIG. 5, the UE and the eNB includes PDCPs (Packet Data Convergence Protocols) 1005 and 1040, RLCs (Radio Link Controls) 1010 and 1035, Medium Access Controls (MACs) 1015 and 1030, respectively, in the wireless protocol of the LTE system.

The PDCPs 1005 and 1040 perform an operation such as compressing/decompressing an IP header. The RLCs 1010 and 1035 reconfigure a PDCP Packet Data Unit (PDU) to be a proper size. The MACs 215 and 230 are connected with various RLC layer devices configured in one UE, and performs an operation of multiplexing RLC PDUs to the MAC PDU and demultiplexing the RLC PDUs from the MAC PDU.

The PHY layers 1020 and 1025 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Further, the PHY layer uses Hybrid ARQ (HARQ) to correct an additional error, and a receiving side transmits 1-bit information to indicate whether a packet transmitted by a transmitting side is received. The 1-bit information is referred to as HARQ ACK/NACK information.

Downlink HARQ ACK/NACK information for uplink transmission is transmitted through a Physical Hybrid-ARQ Indicator CHannel (PHICH) physical channel. Uplink HARQ ACK/HARQ information for downlink transmission is transmitted through a Physical Uplink Control CHannel (PUCCH) or a Physical Uplink Shared CHannel (PUSCH) physical channel. The PUCCH is used when the UE transmits not only the HARQ ACK/NACK information but also downlink Channel Status Information (CSI) and a Scheduling Request (SR) to the eNB.

The SR is 1-bit information. When the eNB transmits the SR to resources within the PUCCH configured by the eNB, the eNB recognizes that the UE has data to be transmitted through uplink and thus allocates uplink resources. The UE may transmit a detailed Buffer Status Report (BSR) message through the uplink resources. The eNB may allocate a plurality of SR resources to one UE.

Meanwhile, the PHY layer may include one or a plurality of frequencies/subcarriers, and technology in which one eNB simultaneously configures and uses a plurality of frequencies is referred to as carrier aggregation (CA).

CA significantly increases the amount of transmission by the number of subcarriers by additionally using a primary carrier and one or a plurality of subcarriers, which is beyond the conventional technology, in which only one subcarrier is used for communication between the UE and the E-UTRAN NodeB (eNB).

Meanwhile, in LTE, a cell within the eNB using a primary carrier is referred to as a Primary Cell (PCell) and a secondary carrier is referred to as a Secondary Cell (SCell). The technology obtained by expanding the CA function to two eNBs is referred to as dual connectivity (DC).

In the DC, the UE is simultaneously connected to and uses a master E-UTRAN NodeB (MeNB) and a secondary E-UTRAN NodeB (SeNB), and cells belonging to the MeNB are referred to as a master cell group (MCG) and cells belonging to the SeNB are referred to as a secondary cell group (SCG).

Each cell group has a representative cell. A representative cell of the primary cell group is referred to as a Primary Cell (PCell) and a representative cell of the secondary cell group is referred to as a Primary Secondary Cell (PSCell). When the NR is used, as the MCG uses LTE technology and the SCG uses NR, the UE may simultaneously use LTE and NR.

Although not illustrated, there is a radio resource control (RRC) layer above the PDCP layer of each of the UE and the eNB, and the RRC layer may transmit and receive an access- and measurement-related configuration control message to control radio resources. The eNB may indicate measurement to the UE through a message of the RRC layer and the UE may report the measurement result to the eNB through the message of the RRC layer.

Figure 6:
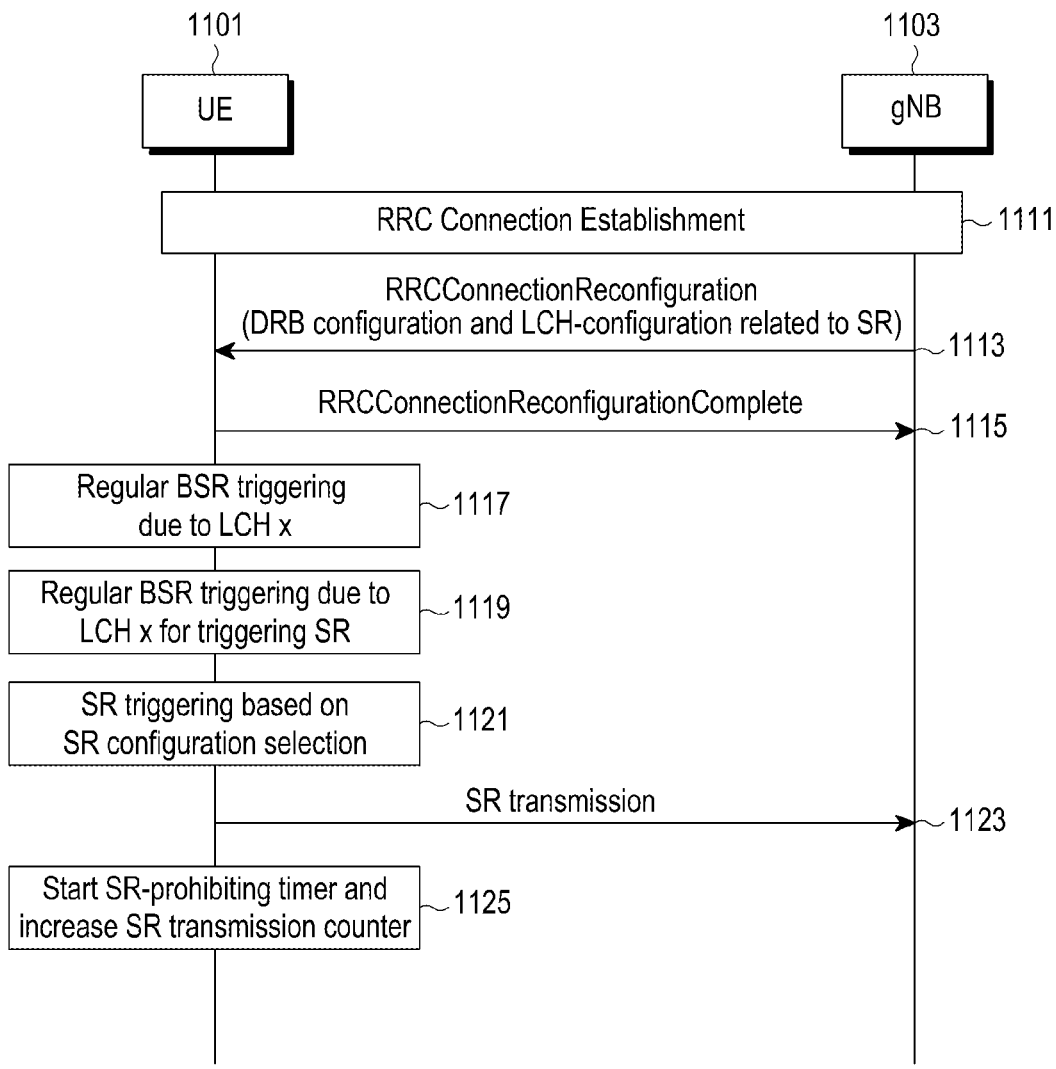
FIG. 6 illustrates a first embodiment of message flow between the UE and the eNB according to a method of transmitting a scheduling request.

FIG. 6 illustrates message flow between the UE and the eNB when a method of transmitting a scheduling request is used.

Referring to FIG. 6, a UE 1101 in an idle mode (RRC_IDLE) accesses the eNB for the reason of generation of data to be transmitted. In the idle mode, the UE is not connected to the network to save power of the UE, so the UE cannot transmit data. In order to transmit data, the UE is required to switch to a connected mode (RRC_CONNECTED).

When the UE successfully accesses the eNB 1103, the UE switches to the connected mode (RRC_CONNECTED) and the connected-mode UE can transmit and receive data to and from the eNB through security activation and bearer configuration for data.

Thereafter, the eNB establishes a bearer (Data Radio Bearer (DRB)) which serves as a logical passage for data transmission to the UE and transmits SR resources for an uplink resource request and relevant configuration information in step 1113. The eNB may configure a plurality of periodic SR configuration information in the UE according to the purpose. For example, the UE may configure two pieces of SR configuration information. SR configuration information 1 may be configuration information to be used when data is generated in logical channels a and b and SR configuration information 2 may be configuration information to be used when data is generated in logical channels c and d. Each piece of the SR configuration information may include information on a logical channel related to the SR configuration information and also information on a plurality of periodic SR resources.

Meanwhile, in the next-generation mobile communication system, the eNB may have a significantly wide bandwidth and accordingly, the eNB may configure only a portion of the corresponding bandwidth in the UE even through the eNB uses the broadband. Such a concept is referred to as a Bandwidth Part (BWP).

With respect to one cell, one or a plurality of BWPs may be configured in one UE depending on an operation scenario, and numerology/Transmission Time Interval (TTI) used by each BWP may be configured differently.

The eNB may configure periodic SR resources according to each BWP in one UE through each piece of SR configuration information. For example, when the UE is configured to use two cells having different frequencies and each cell has three BWPs, the UE has a total of six BWPs, and the eNB may configure one periodic SR resource according to each of the six BWPs for SR configuration information 1 and one periodic SR resource according to each of the six BWPs for SR configuration information 2. Accordingly, when only one BWP is activated for each of the two different cells (that is, when two of the six BWPs are activated), the UE still has the SR configured for each BWP and thus make a request for resources to the eNB.

Further, within each piece of the SR configuration information, an SR-prohibiting timer for preventing frequent SR transmission and a maximum number of SR transmissions may be configured independently from each other.

Meanwhile, the SR-prohibiting timer may be expressed by a unit of a SR period. For example, when the SR period is set to 10 ms and a value of the SR-prohibiting timer is set to 5, a time duration of the SR-prohibiting timer corresponds to 5 ms. When there are six BWPs and respective SR resources have different periods as described in the above example, the UE may use the shortest configuration information period within the corresponding SR configuration information regardless of activation. Alternatively, the UE may use the shortest configuration information period among SR resource periods of the currently activated BWP within the corresponding SR configuration information. Alternatively, the UE may use not only the corresponding SR configuration information but also the shortest configuration information period among all the configured SR resource periods.

Accordingly, the following information may be configured according to each piece of SR configuration information.

List of time/frequency resources of SR transmission resources of corresponding SR configuration information Time pattern: offset period Frequency: cell identifier, BWP identifier, Physical Resource Block (PRB) identifier Code: physical signal sequence used in SR transmission Logical channel list (a and b) mapped to corresponding SR configuration information SR-prohibiting timer (sr-ProhibitTimer) and maximum used for corresponding SR configuration information and a number of SR transmissions (sr-TransMax)

The eNB may transmit various configurations to the UE through an RRCConnectionReconfiguration message of the RRC layer. Thereafter, the UE transmits an acknowledgement message of the configuration indication, in which case the UE may use an RRCConnectionReconfigurationComplete message of the RRC layer in step S1115.

Meanwhile, the UE may trigger a current buffer status report (BSR) of the UE according to various conditions below and the BSR is divided into three types according to a condition of triggering transmission. A first type is a regular BSR, a second type is a periodic BSR, and a third type is a padding BSR.

First type: Regular BSR

BSR transmitted in the case in which a BSR retransmission timer (retxBSR-Timer) expires if there is data which can be transmitted to a logical channel/Radio Bearer (RB) belonging to a Logical Channel Group (LCG).

BSR transmitted in the case in which data to be transmitted from a higher layer (RLC or PDCP layer) to the logical channel/radio bearer belonging to the LCG is generated and the data has a higher priority than a logical channel/radio bearer belonging to another LCG.

BSR transmitted in the case in which data to be transmitted from a higher layer (RLC or PDCP layer) to the logical channel/radio bearer belonging to the LCG is generated and there is no data in any LCG except for the data.

Second type: Periodic BSR

BSR transmitted in the case in which a periodic BSR timer (periodicBSR-Timer) configured in the UE expires Third type: Padding BSR BSR transmitted in the case in which uplink resources are allocated padding bits which fill a space left after data transmission are equal to or larger than a sum of the size of a BSR MAC CE and the size of a sub header of the BSR MAC CE.

transmit a truncated BSR if there are packets in buffers of a plurality of LCGs.

When the regular BSR is triggered by generation of traffic of any logical channel according to the condition in step 1117, the UE selects particular SR configuration information (for example, SR configuration information 1 or 2) to which the corresponding logical channel is mapped in step 1119, and when there is the corresponding configuration information, triggers the SR as the selected SR configuration information in step 1121.

Accordingly, the UE transmits an SR signal to the eNB through the earliest SR resources among one or a plurality of SR resources configured in the corresponding SR configuration information or SR resources according to the sequence in the SR configuration information in step 1123.

After transmitting the SR signal to the eNB, the UE drives the SR-prohibiting timer configured in the corresponding SR configuration information, and when the timer is driven according thereto, does not transmit the SR for the corresponding SR configuration information. Further, after transmitting the SR signal to the eNB, the UE increases a count of the number of SR transmissions and determines whether the counter reaches the corresponding maximum number of transmissions configured. When the count of the SR transmission reaches the corresponding maximum number of SR transmissions configured, the UE performs random access to the eNB, transmits the BSR to the eNB, and reports a current buffer status of the UE.

FIG. 7 is a flowchart illustrating the operation of the UE when a method of transmitting a scheduling request is used.

Referring to FIG. 7, it is assumed that the UE is connected to the LTE eNB and is thus in a connected mode (RRC_CONNECTED). Thereafter, the UE receives configuration of a DRB from the eNB, receives configuration of SR resources and relevant configuration information for an uplink resource request, and transmits an acknowledgement message thereof in step 1203.

The SR resources and the relevant configuration information for the uplink resource request may include a plurality of pieces of periodic SR configuration information. For example, the UE may configure two pieces of SR configuration information. SR configuration information 1 may be configuration information to be used when data is generated in logical channels a and b and SR configuration information 2 may be configuration information to be used when data is generated in logical channels c and d. Each piece of the SR configuration information may include information on a logical channel related to the SR configuration information and also information on one or a plurality of periodic SR resources. Within each piece of the SR configuration information, the UE may receive configuration of periodic SR resources according to each BWP.

When the UE is configured to use two cells having different frequencies and each cell has three BWPs, the UE has a total of six BWPs, and the eNB may configure one periodic SR resource according to each of the six BWPs for SR configuration information 1 and one periodic SR resource according to each of the six BWPs for SR configuration information 2. Accordingly, when only one BWP is activated for each of the two different cells (that is, when two of the six BWPs are activated), the UE still has the SR configured for each BWP and thus make a request for resources to the eNB.

Further, within each piece of the SR configuration information, an SR-prohibiting timer for preventing frequent SR transmission and a maximum number of SR transmissions may be configured independently from each other.

Meanwhile, the SR-prohibiting timer may be expressed by a unit of a SR period. For example, when the SR period is set to 10 ms and a value of the SR-prohibiting timer is set to 5, a time duration of the SR-prohibiting timer corresponds to 5 ms. When there are six BWPs and respective SR resources have different periods as described in the above example, the UE may use the shortest configuration information period within the corresponding SR configuration information regardless of activation. Alternatively, the UE may use the shortest configuration information period among SR resource periods of the currently activated BWP within the corresponding SR configuration information. Alternatively, the UE may use not only the corresponding SR configuration information but also the shortest configuration information period among all the configured SR resource periods.

Accordingly, the following information may be configured according to each piece of SR configuration information.

list of time/frequency resources of SR transmission resources of corresponding SR configuration information
  Time pattern: offset period
  Frequency: cell identifier, BWP identifier, Physical Resource Block (PRB) identifier
  Code: physical signal sequence used in SR transmission
logical channel list (a and b) mapped to corresponding SR configuration information
SR-prohibiting timer (sr-ProhibitTimer) and maximum used for corresponding SR configuration information and a number of SR transmissions (sr-TransMax)

Meanwhile, the UE may trigger a current buffer status report (BSR) of the UE according to various conditions below and the BSR is divided into three types according to a condition of triggering transmission. A first type is a regular BSR, a second type is a periodic BSR, and a third type is a padding BSR.

First type: Regular BSR
  BSR transmitted in the case in which a BSR retransmission timer ((retxBSR-Timer) expires if there is data which can be transmitted to a logical channel/ Radio Bearer (RB) belonging to a Logical Channel Group (LCG).
  BSR transmitted in the case in which data to be transmitted from a higher layer (RLC or PDCP layer) to the logical channel/radio bearer belonging to the LCG is generated and the data has a higher priority than a logical channel/radio bearer belonging to another LCG.
  BSR transmitted in the case in which data to be transmitted from a higher layer (RLC or PDCP layer) to the logical channel/radio bearer belonging to the LCG is generated and there is no data in any LCG except for the data.
Second type: Periodic BSR
  BSR transmitted in the case in which a periodic BSR timer (periodicBSR-Timer) configured in the UE expires Third type: Padding BSR
  BSR transmitted in the case in which uplink resources are allocated padding bits which fill a space left after data transmission are equal to or larger than a sum of the size of a BSR MAC CE and the size of a sub header of the BSR MAC CE.
  transmit a truncated BSR if there are packets in buffers of a plurality of LCGs.

When the regular BSR is triggered by generation of traffic of any logical channel according to the condition in step 1205, the UE selects particular SR configuration information (for example, SR configuration information 1 or 2) to which the corresponding logical channel is mapped in step 1207, and when there is the corresponding configuration information, triggers the SR as the selected SR configuration information in step 1209.

Accordingly, the UE transmits an SR signal to the eNB through the earliest SR resources among one or a plurality of SR resources configured in the corresponding SR configuration information or SR resources according to the sequence in the SR configuration information in step 1211.

After transmitting the SR signal to the eNB, the UE drives the SR-prohibiting timer configured in the corresponding SR configuration information, and when the timer is driven according thereto, does not transmit the SR for the corresponding SR configuration information. If the UE receives resources for the BSR from the eNB for a predetermined time, the UE transmits the BSR to the eNB in step 1215. If the UE does not receive resources for the BSR from the eNB for a predetermined time in step 1213 and the corresponding number of SR transmissions does not reach the configured maximum number in step 1217, the UE may retransmit the corresponding SR in step 1211.

Since there are a lot of UEs, the eNB may not afford to provide uplink resources to the corresponding UE or the eNB may not properly receive the SR. If the number of SR transmissions reaches the configured maximum number of transmissions, the UE may perform a random access procedure to the eNB, makes a request for uplink resources, and transmit the BSR through the corresponding resources in step 1219.

FIG. 4 illustrates a structure of the LTE system which is referred to for description of the disclosure.

Referring to FIG. 4, a radio access network of the LTE system includes next-generation evolved Node Bs (hereinafter, referred to as eNBs, Node Bs, or base stations) 905, 910, 915 and 920, a Mobility Management Entity (MME) 925, and a Serving-Gateway (S-GW) 930. A User Equipment (UE) 935 (or a terminal) may access an external network through the eNBs 905 to 920 and the S-GW 930.

The eNBs 905 to 920 correspond to nodeBs of a UMTS system. The eNB is connected with the UE 935 through a wireless channel, and plays a more complicated role than the node B. In the LTE system, since all user traffic including a real time service such as a VoIP (Voice over IP) through an Internet protocol are serviced through a shared channel, an apparatus for collecting and scheduling status information on buffer statuses of UEs, available transmission power status, and channel statuses is required, and the ENBs 905 to 920 serve as this apparatus.

One eNB generally controls a plurality of cells. For example, in order to implement a transmission rate of 100 Mbps, the LTE system uses Orthogonal Frequency Division Multiplexing (OFDM) as radio access technology in a bandwidth of 20 MHz. Further, an AMC (Adaptive Modulation and Coding) scheme of determining a modulation scheme and a channel coding rate is applied according to a channel status of the UE. The S-GW 930 is a device for providing a data bearer, and generates or removes the data bearer under a control of the MME 925. The MME is a device for performing not only a function of managing mobility of the UE but also various control functions and is connected to a plurality of eNBs.

FIG. 5 illustrates the structure of the wireless protocol in the LTE system which is referred to for description of the disclosure.

Referring to FIG. 5, the UE and the eNB includes PDCPs (Packet Data Convergence Protocols) 1005 and 1040, RLCs (Radio Link Controls) 1010 and 1035, Medium Access Controls (MACs) 1015 and 1030, respectively, in the wireless protocol of the LTE system.

The PDCPs 1005 and 1040 perform an operation such as compressing/decompressing an IP header. Main functions of the PDCP are described below.

- Header compression and decompression function ((Header compression and decompression: ROHC only)
- User data transmission function
- Sequential delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU deletion function (Timer-based SDU discard in uplink)
- Radio Link Control (RLC) 1010 or 1035 reconfigures the PDCP Packet Data Unit (PDU) to be the proper size and performs an ARQ operation. Main functions of the RLC are described below.
- Data transmission function (Transfer of upper layer PDUs)
- ARQ function (Error Correction through ARQ (only for AM data transfer))
- Concatenation, segmentation, and reassembly function (Concatenation, segmentation and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer)
- Duplication detection function (only for UM and AM data transfer))
- Error detection function (Protocol error detection (only for AM data transfer))
- RLC SDU deletion function (RLC SDU discard (only for UM and AM data transfer))
- RLC re-establishment function (RLC re-establishment)

The MAC 1015 and 1030 are connected with various RLC layer devices configured in one UE, and perform a function of multiplexing RLC PDUs to the MAC PDU and demultiplexing the RLC PDUs from the MAC PDU. Main functions of the MAC are described below.

- Mapping function (Mapping between logical channels and transport channels)
- Multiplexing and demultiplexing function (Multiplexing/demultiplexing of MAC SDUs belonging to one or different logical channels into/from transport blocks (TB) delivered to/from the physical layer on transport channels)
- Scheduling information report function (Scheduling information reporting)
- HARQ function (Error correction through HARQ)
- Logical channel priority control function (Priority handling between logical channels of one UE)
- UE priority control function (Priority handling between UEs by means of dynamic scheduling)
- MBMS service identification function (MBMS service identification)
- Transport format selection function (Transport format selection)
- Padding function (Padding)

The PHY layers 1020 and 1025 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 8:
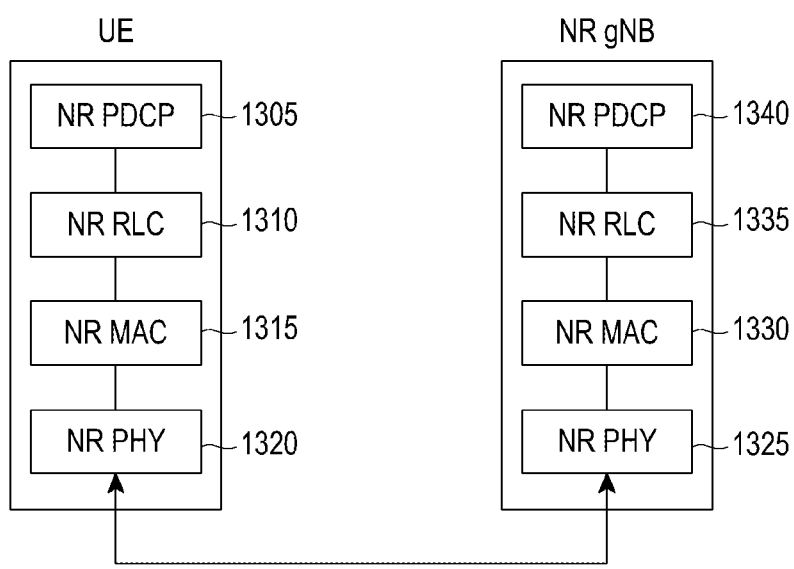
FIG. 8 illustrates a structure of a wireless protocol of a next-generation mobile communication system to which the disclosure can be applied.

FIG. 8 illustrates a structure of a wireless protocol of the next-generation mobile communication system to which the disclosure can be applied.

Referring to FIG. 8, the UE and the NR NB include NR PDCPs 1305 and 1340, NR RLCs 1310 and 1335, and NR MACs 1315 and 1330, respectively, in the wireless protocol of the next-generation mobile communication system.

Main functions of the NR PDCPs 1305 and 1340 may include some of the following functions.

- Header compression and decompression function ((Header compression and decompression: ROHC only)
- User data transmission function
- Sequential delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU removal function (Timer-based SDU discard in uplink)

The reordering function of the NR PDCP device is a function of sequentially reordering PDCP PDUs received from a lower layer on the basis of a PDCP Sequence Number (SN) and may include a function of sequentially transferring the reordered data to a higher layer, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs 1310 and 1335 may include some of the following functions.

- Data transmission function (Transfer of upper layer PDUs)
- Sequential delivery function (In-sequence delivery of upper layer PDUs)
- Non-sequential delivery function (Out-of-sequence delivery of upper layer PDUs)

ARQ function (Error correction through ARQ)

Concatenation, segmentation, and reassembly function (Concatenation, segmentation and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring PDCP PDUs received from a lower layer to a higher layer) and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs before the lost RLC SDU to the higher layer, if a predetermined timer expires even through there is a lost RLC SDU, a function of sequentially transferring all RLC SDUs received before the timer starts to the higher layer, or if a predetermined timer expires even through there is a lost RLC SDU, a function of sequentially transferring all RLC SDUs received up to now to the higher layer.

Further, the NR RLC device may process the RLC PDUs sequentially according to a reception order thereof (according to an arrival order regardless of a serial number or a sequence number) and transfer the RLC PDUs to the PDCP device regardless of sequences thereof (out of sequence delivery). In the case of segments, the NR RLC device may receive segments which are stored in the buffer or will be received in the future, reconfigure the segments to be one RLC PDU, process the RLC PDU, and transmit the same to the PDCP device. The NR RLC layer may not include a concatenation function, and the function may be performed by the NR MAC layer or may be replaced with a multiplexing function of the NR MAC layer.

The non-sequential function (Out-of-sequence delivery) of the NR RLC device is a function of transferring RLC SDUs received from a lower layer directly to a higher layer regardless of sequences of the RLC SDUs and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1315 and 1330 may be connected to a plurality of NR RLC layer devices configured in one UE and main functions of the NR MAC may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Logical channel priority control function (Priority handling between logical channels of one UE)

UE priority control function Priority handling between UEs by means of dynamic scheduling)

MBMS service identification function (MBMS service identification)

Transport format selection function (Transport format selection)

Padding function (Padding)

The PHY layers 1320 and 1325 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 9:
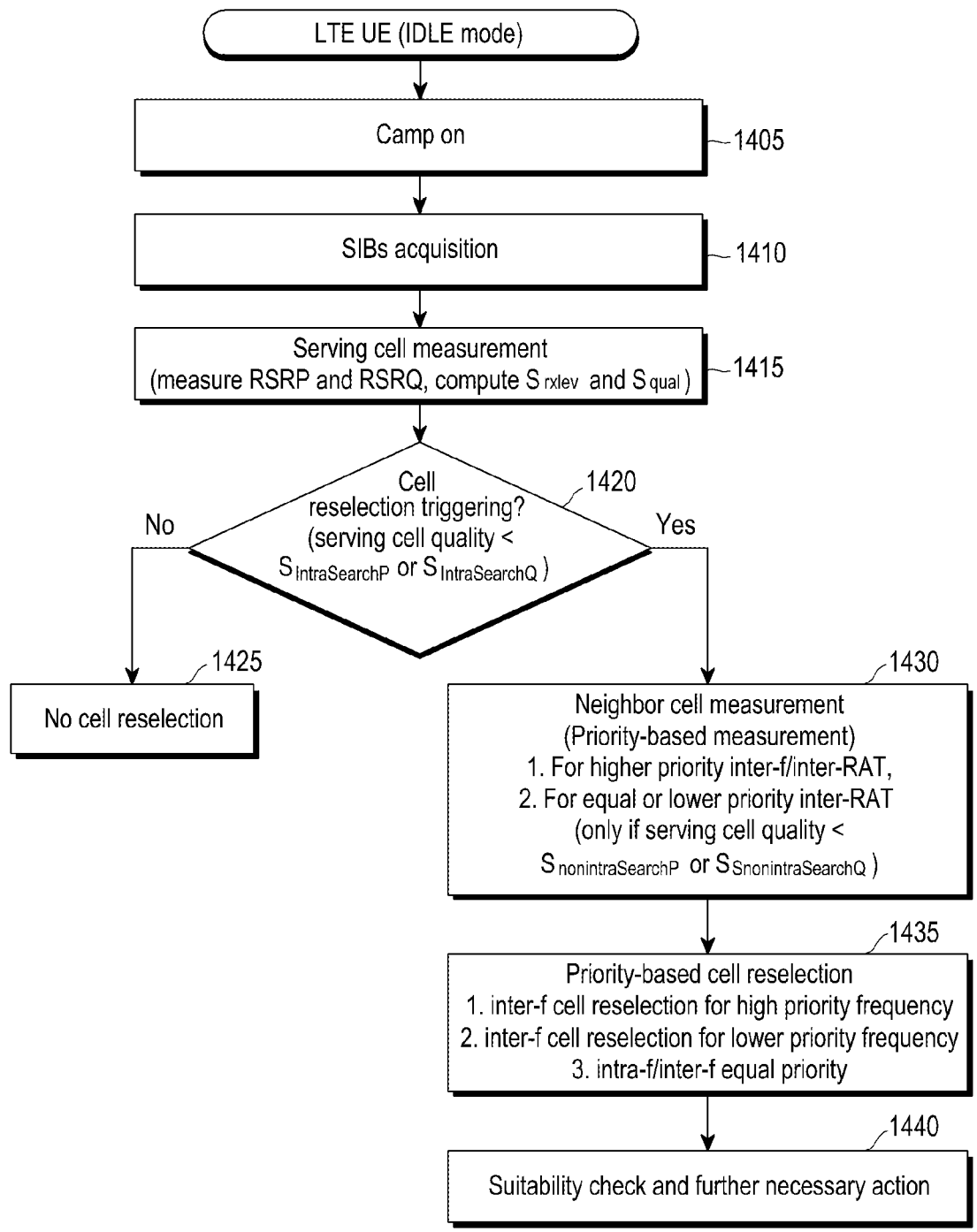
FIG. 9 illustrates a procedure in which the UE in an idle state measures and reselects a cell in the LTE system.

FIG. 9 illustrates a procedure in which the UE in the idle state measures and reselects a cell in the LTE system.

Referring to FIG. 9, cell reselection is a procedure in which the UE determines a cell on which the UE camps when QoS with a serving cell becomes lower than QoS with a neighboring cell due to movement of the UE in the idle state.

While handover is determined by a network (MME or source eNB), cell reselection is determined on the a measurement value by the UE. The cell which the UE reselects during movement may be a cell having the same LTE frequency (intra-frequency) as the serving cell, a cell using a different LTE frequency (inter-frequency), or a cell having different RAT (inter-RAT).

The UE in the idle state performs a series of operations while camping on in the serving cell in step 1405. First, the UE receives system information (System Information Block (SIB) broadcasted by the eNB of the serving cell in step 1410. For reference, an MIB, SIB 1, and SIB 2 are system information applied to all UE in common, and SIB 3 to SIB 8 include information required when the UE in the idle state reselects a cell.

Information related to intra-LTE frequency measurement is transmitted through SIB 4 and information related to inter-frequency measurement is transmitted through SIB 5. The system information includes a threshold value used when it is determined whether to measure a neighboring cell signal and a parameter used for calculating ranks of the serving cell and neighboring cells. Further, for intra-frequency measurement, a carrier frequency is the same as that of the current serving cell, so that SIB 5 specifies carrier frequency information of neighboring cells required to be measured even through the carrier frequency information is not separately signaled through SIB 4.

The UE in the idle state wakes up every Discontinuous Reception (DRX) period and measures an absolute signal strength (for example, Reference Signal Received Power (RSRP) $Q_{rxlevmeas}$ and relative signal quality (Reference Signal Received Quality (RSRQ) $Q_{qualmeas}$) of the serving cell in step 1415. The UE calculates a reception level (Srxlev) and a reception quality (Squal) of the serving cell on the basis of the measurement values and parameters received from the eNB and compares the values with threshold values to determine whether to perform cell reselection. The reception level (Srxlev) and the reception quality (Squal) of the serving cell are calculated through equations below.

$$Srxlev=Q_{rxlevmeas}-(Q_{rxlevmin}+Q_{rxlevminoffset})-P\text{compensation}-Q\text{offset}_{temp}$$

$$Squal=Q_{qualmeas}-(Q_{qualmin}+Q_{qualminoffset})-Q\text{offset}_{temp}$$

Definition of the parameters used herein refers to the 3GPP standard document "36.304: User Equipment (UE) procedures in idle mode".

When the signal strength and quality of the serving cell calculated from the measurement values are smaller than threshold values (Srxlev<$S_{IntraSearchP}$ or Squal<$S_{IntraSearchQ}$), cell reselection is triggered in step 1420. If the condition is not satisfied, the UE continuously camps on the corresponding serving cell without cell reselection in step 1425. If the condition is satisfied and thus cell reselection is triggered, the UE measures neighboring cells on the basis of the priority in step 1430. With respect to inter-frequency inter-RAT cells having a high priority, the UE starts measurement of neighboring cells regardless of quality of the serving cell. Further, with respect to inter-frequency cells having a priority which is the same as or lower than the serving cell, the UE starts measurement of neighboring cells if the signal strength and quality of the serving cell are smaller than threshold values received as system information, that is, if Srxlev<$S_{nonIntraSearchP}$ or Squal<$S_{nonIntraSearchQ}$, starts measurement neighboring cells.

When measurement of the neighboring cells end in step 1430, the UE performs cell reselection based on the priority in step 1435. First, when reselecting the inter-frequency inter-RAT cell having a high priority, if the signal quality of the corresponding cell is higher than a threshold value $Thresh_{X,\ HighQ}$ for a particular time $Treselection_{RAT}$ (Squal>$Thresh_{X,\ HighQ}$), the UE performs reselection of the corresponding cell. Second, for reselection of the inter-frequency cell having a low priority, the UE first determines whether a condition in which the signal quality of the serving cell is lower than a threshold value $Thresh_{Serving,\ LowQ}$ is satisfied (Squal<$Thresh_{Serving,\ LowQ}$) and if the condition is satisfied and the signal quality of the inter-frequency cell is higher than the threshold value $Thres_{Serving,\ LowQ}$ for a particular time $Treselection_{RAT}$ (Squal>$Thresh_{X,\ LowQ}$) reselects the corresponding cell. Third, for reselection of intra-frequency/inter-frequency cells having the same priority, the UE acquires a rank of each cell on the basis of measurement values (for example, RSRP) from neighboring cells. The ranks of the serving and the neighboring cells are calculated through equations below.

$$R_s = Q_{meas,s} + Q_{Hyst} - Qoffset_{temp}$$

$$R_n = Q_{meas,n} - Qoffset - Qoffset_{temp}$$

$Q_{meas,s}$ denotes a measurement value of RSRP of the serving cell, $Q_{meas,n}$ denotes a measurement value of RSRP of a neighboring cell, $Q_{Hyst}$ denotes a hysteresis value of the serving cell, Qoffset denotes an offset between the serving cell and the neighboring cell, and $Qoffset_{temp}$ denotes an offset temporarily applied to the cell. When the ranks of the neighboring cells acquired through the equation are higher than the rank of the serving cell (Rn>Rs), the UE camps on an optimal cell among the neighboring cells.

When the cell reselection is determined in the process, the UE receives system information from the corresponding cell and checks suitability indicating whether a service can be received from a new serving cell in step 1440. If a Tracking Area Identity (TAI) is not in a TAI list of the UE, the UE performs a Tracking Area Update (TAU) procedure and, when the corresponding cell is determined as a new cell, performs an operation for the serving cell (acquiring system information, paging monitoring, and measuring serving cell signal).

Figure 10:
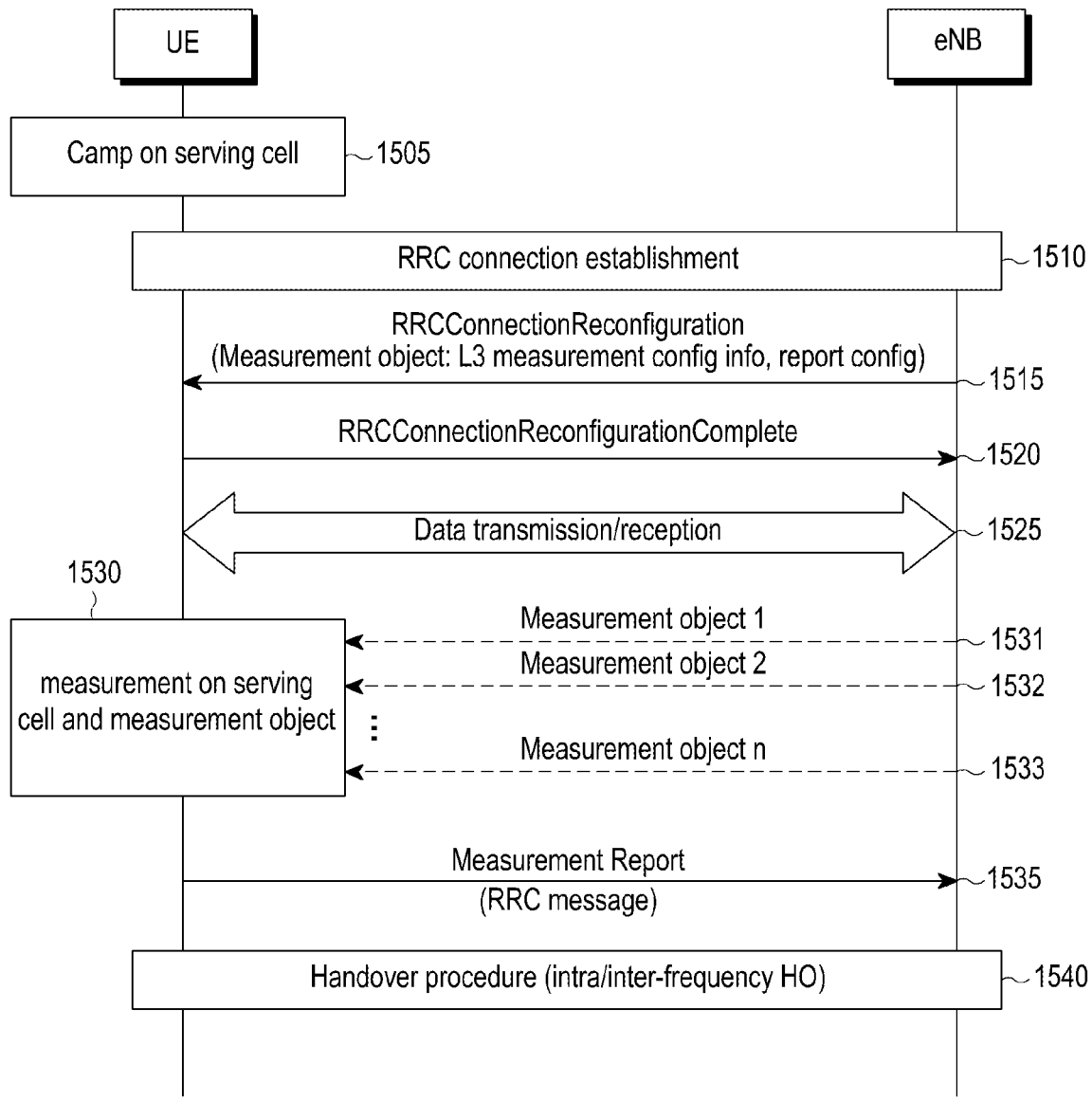
FIG. 10 illustrates a channel measurement and report procedure of the UE in the connected state in the LTE system.

FIG. 10 illustrates a channel measurement and report procedure of the UE in the connected state in the LTE system.

Referring to FIG. 10, a UE in an idle mode (RRC_IDLE) searches for a suitable cell and camps on the corresponding eNB in step 1505, and then accesses the eNB for the reason of generation of data to be transmitted in step 1510. In the idle mode, the UE is not connected to the network to save power of the UE, so the UE cannot transmit data. In order to transmit data, the UE is required to switch to a connected mode (RRC_CONNECTED). Camping means that the UE receives a paging message in order to determine whether data is received through downlink while staying in the corresponding cell. When the UE successfully performs the procedure of access to the eNB, the UE switches to the connected mode (RRC_CONNECTED) and the UE in the connected mode can transmit and receive data to and from the eNB.

According to movement of the connected-mode UE to the inside or the outside of the cell, the UE may be required to instruct movement for transmission and reception from and to another cell/eNB. To this end, the eNB configures indication of measurement (L3 measurement) for another cell through an RRC message in step 1515. The measurement indication may include an object, a condition, and parameters for the measurement result which the UE reports to the eNB. The UE receiving the configuration information transmits an acknowledgement message indicating successful reception of configuration information to the eNB in step 1520. For the acknowledgement message, an RRCConnectionReconfigurationComplete message may be used.

The UE may transmit and receive data to and from the eNB in step 1525 and measure strength of signals of the serving cell and a downlink cell of measurement objects 1531, 1532, and 1533 in step 1530. In the above step, the UE identifies a measurement result of a cell level and determines a report condition configured by the eNB. The configuration condition may be configured differently according to the intra-frequency or the inter-frequency. Particularly, in the case of inter-frequency channel measurement configuration, carrier frequency information indicating the corresponding frequency is needed. The UE may report the measurement result to the eNB through an RRC message according to the configured measurement value report condition in step 1535, and the eNB may perform a handover procedure on the basis of the measurement value received from the UE in step 1540.

Definition of inter-frequency/intra-frequency measurement may be differently applied to the next-generation mobile communication system (NR) unlike the conventional LTE system. In NR, Radio Resource Measurement (RRM) is performed on the basis of Synchronization Signal Block (SSB). While a subcarrier spacing (SCS) applied to one frequency is constant in LTE, various subcarrier spacings may be used for the same frequency band in NR. That is, if channel measurement for neighboring cell eNBs is instructed in NR, an SSB in a particular cell is measured and it should be additionally determined whether subcarrier spacing of the SSB is constant in order to make definition of intra-frequency/inter-frequency measurement. Intra-frequency/inter-frequency measurement is defined below.

1. SSB-based intra-frequency measurement: in order to measure neighboring cells for intra-frequency, measure SSBs of neighboring cells having a central frequency and SCS which are the same as the SSB of the current serving cell.

2. SSB-based inter-frequency measurement: in order to measure neighboring cells for inter-frequency, measure SSBs of neighboring cells having a central frequency different from the SSB of the current serving cell but SSBs of other neighboring cells having the same central frequency as the SSB of the current serving cell but having different SCS.

Definition of the SSB-based measurement may be made on the assumption that the same cell transmits only one SSB. That is, intra-frequency/inter-frequency measurement may be determined on the basis of the central frequency and SCS of neighboring cells. Particularly, for intra-frequency measurement of the idle UE, system information may include measurement configuration for neighboring intra-frequency cells (SIB 4 in LTE) and measurement configuration for neighboring inter-frequency cells (SIB 5 in LTE) like in LTE. The number and identification of the corresponding system information may be equally used in NR. SIB 4 and SIB 5 may be transmitted through Other System Information (OSI). System information in NR may be largely divided into two pieces of information such as Master System Information (MSI) which all UEs requires in common and OSI which may be provided according to an on-demand request from the UE.

Figure 11:
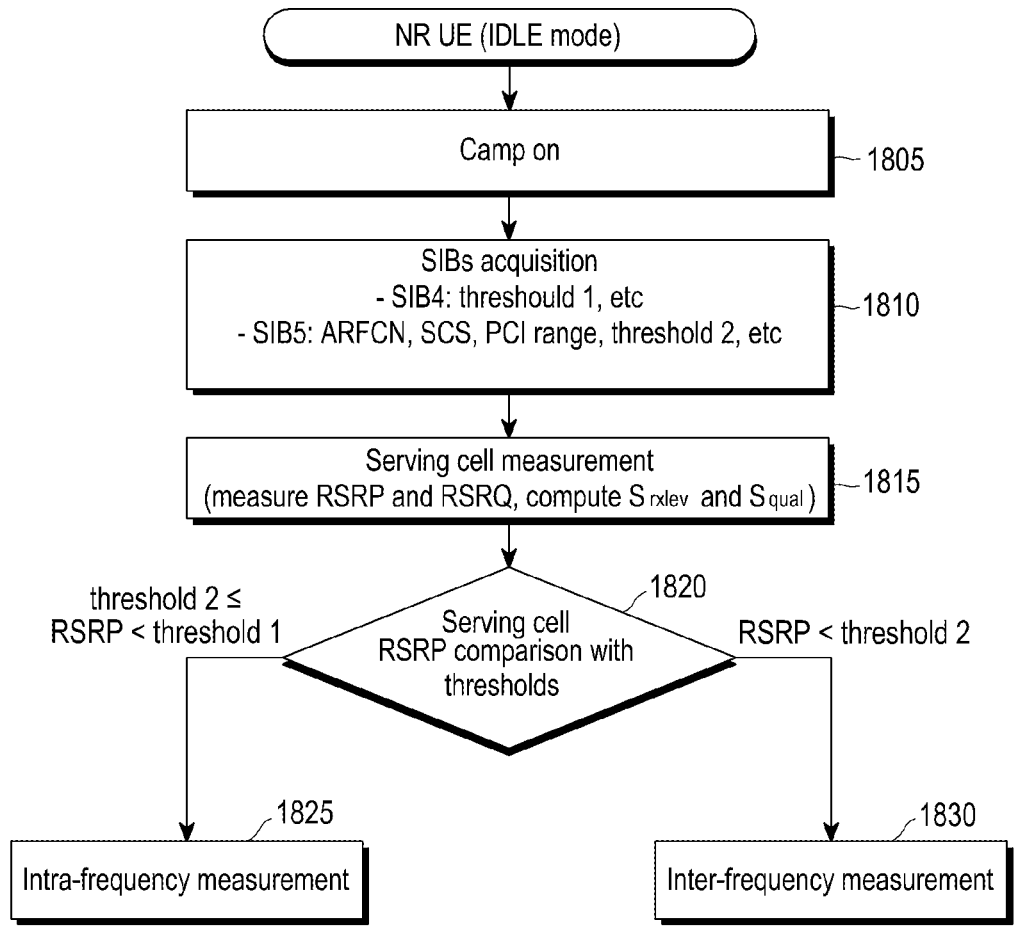
FIG. 11 illustrates the overall operation of the UE according to a first embodiment of the disclosure.

FIG. 11 illustrates the overall operation of the UE according to an embodiment of the disclosure.

Referring to FIG. 11, the UE in the idle state performs a series of operations while camping on the serving cell in step 1805. First, the UE receives system information (System Information Block (SIB) broadcasted by the eNB of the serving cell in step 1810. For reference, an MIB, SIB1, and SIB 2 are system information applied to all UEs in common, and are defined as MSI in NR and broadcasted to all UE in common by the eNB. On the other hand, SIB3 to SIB 8 include information required when the UE in the idle state reselects a cell, and may be defined as OSI in NR and broadcasted by the eNB according to a request from the UE or directly transmitted through RRC signaling. Particularly, information related to intra-frequency measurement in NR is transmitted through SIB 4 and information related to inter-frequency measurement is transmitted through SIB 5.

SIB 4 may include a threshold value (threshold 1) used for determining whether to perform neighboring cell signal measurement and parameters (cell identifier or offsets of respective cells) which can be used for calculating ranks by providing priorities to neighboring intra-frequency cells according to each cell list.

On the other hand, SIB 5 includes carrier frequency information of neighboring cells required to be measured and information on subcarrier intervals. The carrier frequency information may be omitted in SIB 5. If SIB 5 does not include the carrier frequency information, it is determined that the carrier frequency information is the same as carrier frequency information of the serving cell. That is, measurement of the inter-frequency having the same central frequency as a central frequency of SSB of the current serving cell and having a different subcarrier interval is performed. Multi-set configuration for a plurality of cells can be performed in SIB 5, and each set has a configuration value below.

ARFCN of the reference SSB: frequency information of reference SSB

SCS of the reference SSB: subcarrier information of reference SSB

PCI range (start #+range): designate a physical cell index having the subcarrier configuration (designate a range of all applied cells from a start cell). Alternatively, explicitly applied cells may be indicated in the form of a list.

SIB 4 may also include a threshold value (threshold 2) used for determining whether to perform neighboring cell signal measurement and parameters (cell identifier or offsets of respective cells) which can be used for calculating ranks by providing priorities to neighboring inter-frequency cells according to each cell list.

In step 1815, the UE measures signal strength (for example, RSRP) of the reference SSB for the serving cell and compares the signal strength of the reference SSB of the corresponding serving cell with threshold values received through SIB 4 and SIB 5 to determine the neighboring cell measurement operation. If the RSRP value of the SSB of the serving cell is smaller than threshold 1 but larger than threshold 2 (threshold 2⇐RSRP of serving cell<threshold 1), the UE measures the reference SSB for neighboring cells indicated by SIB 4 in step 1825 (perform intra-frequency measurement). The SSB central frequency of the neighboring cell to be measured is the same as information on the SSB central frequency of the current serving cell. Information on the SSB subcarrier interval of the neighboring cell to be measured is the same as information of the SSB subcarrier interval of the current serving cell. That is, the corresponding central frequency information and the subcarrier information may be omitted in SIB 4.

If the RSRP value of the SSB of the serving cell is smaller than threshold 2 (RSRP of serving cell<threshold 2), the UE measures the reference SSB for neighboring cells indicated by SIB 5 and the SSB for different RAT indicated by another SIB in step 1830 (perform inter-frequency measurement).

The SSB central frequency of the neighboring cell to be measured is specified as ARFCN in the SIB, and SSB subcarrier interval information of the neighboring cell to be measured is specified in SIB 5. The ARFCN information or the subcarrier interval information may be omitted in SIB 5. If the ARFCN information or the subcarrier interval information is omitted, it may mean that the ARFCN information or the subcarrier interval information is the same as the SSB central frequency information or the subcarrier interval information of the serving cell. However, the central frequency information of the reference SSB and the subcarrier interval information cannot be simultaneously omitted. This is because definition of inter-frequency measurement means the case in which only one of the central frequency information and the subcarrier interval information in the SSB of the neighboring cell is different. In the case of measurement for different RAT, SCS information and PCI range are omitted, and only ARFCN information may be included.

Figure 12:
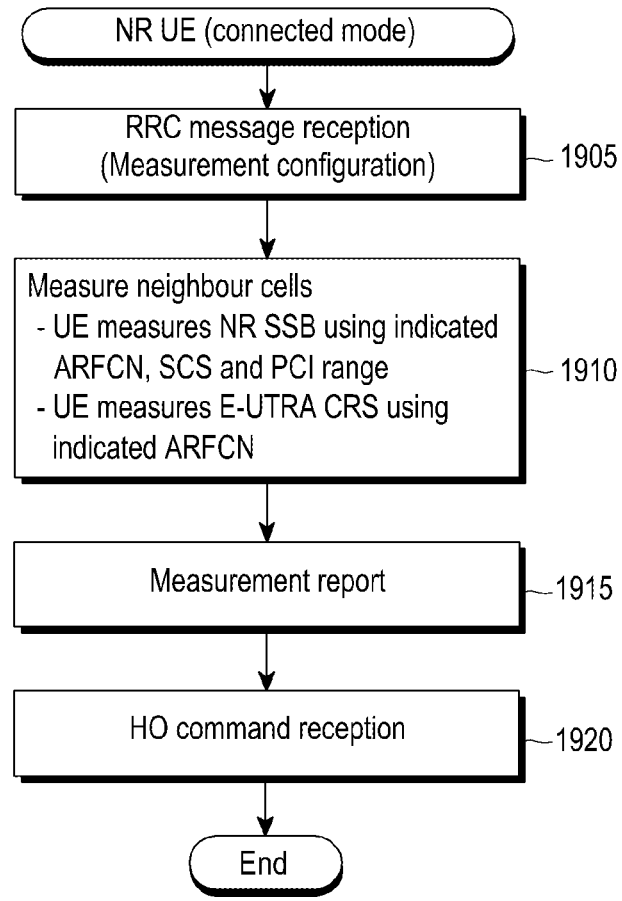
FIG. 12 illustrates the overall operation of the UE according to a second embodiment of the disclosure.

FIG. 12 illustrates the overall operation of the UE according to an embodiment of the disclosure.

Referring to FIG. 12, as movement of the connected-mode UE to the inside or the outside of the cell, the UE may be required to instruct movement form transmission and reception from and to another cell/eNB. To this end, the eNB configures indication of measurement (L3 measurement) for another cell through an RRC message in step 1905. The measurement indication may include an object, a condition, and parameters for the measurement result which the UE reports to the eNB. Particularly, the measurement configuration value may include the following configuration value according to an object to be measured (Radio Access Technology (RAT)).

1. NR Measurement object

ARFCN of the reference SSB: frequency information of reference SSB

SCS of the reference SSB: subcarrier information of reference SSB

PCI range (start #+range): designate a physical cell index having the subcarrier configuration (designate a range of all applied cells from a start cell). Alternatively, explicitly applied cells may be indicated in the form of a list.

2. E-UTRA Measurement object

ARFCN of the reference SSB: frequency information of reference SSB

In step 1910, the UE measures a signal strength of a serving cell and a downlink cell for a measurement object configured in step 1905. In step 1910, the UE identifies a measurement result of a cell level and determines a report condition configured by the eNB. The configuration condition may be configured differently according to the intra-frequency and the inter-frequency. Particularly, in the case of inter-frequency channel measurement configuration, carrier frequency information and subcarrier interval information indicating the corresponding frequency are needed. The UE may report the measurement result to the eNB through an RRC message according to the configured measurement value report condition in step 1915, and the eNB may perform a handover procedure on the basis of the measurement value received from the UE in step 1920. As described above, the measurement object may be not only NR but also different RAT (E-UTRA).

A table below shows summary of the content of the specification.

TABLE 1

1: Motivation/Problem Description/Background
Current Status:
    New definition for intra-frequency/inter-frequency measurement is introduced
    SS block(SSB) based RRM measurements
        SSB based Intra-frequency Measurement: A measurement is defined as a SSB based intra-frequency measurement provided the center frequency of the SSB of the serving cell and the center frequency of the SSB of the neighbour cell are the same, and the subcarrier spacing of the two SSBs are also the same.
        SSB based Inter-frequency Measurement: A measurement is defined as a SSB based inter-frequency measurements provided the center frequency of the SSB of the serving cell and the center frequency of the SSB of the neighbour cell are different, or the subcarrier spacing of the two SSBs are also different.
        The above SSB based measurement definitions assume that the same cell transmits only one SSB
    intra-frequency/inter-frequency measurement is determined based on both the center frequency and SCS(subcarrier spacing)
2: Main points
    NR SIB 4 for the idle mode UE
        neighbor cell information whose center frequency of the reference SSB and the SCS of the reference SSB are same as those of the serving cell
    NR SIB 5 for idle mode UE
        neighbor cell information whose center frequency of the reference SSB is different from that of the serving cell
        neighbor cell information whose center frequency of the reference SSB is same as that of the serving cell but the SCS of the reference SSB is different from that of the serving cell
        Multiple set of cells can be included in the SIB5
        Each set is associated with the following information
            ARFCN of the reference SSB
            SCS of the reference SSB
            PCI range (start # + range) black list? or white list?
    SIB 4 and SIB 5 are transmitted as OSI
    For connected UE, the center frequency and SCS of the reference SSB is defined as Measurement object
3: Operations
Idle mode UE
    UE: camping on a cell x
    UE: receiving measurement related SIBs (e.g. SIB4 and SIB5)
    UE: RSRP of the reference SSB is above threshold1, measure only the serving cell's reference SSB
    UE: RSRP of the reference SSB is below threshold1 but about threshold2, measure the reference SSBs of the neighbor cells indicated in SIB4
        the center-frequency of the reference SSB to be measured = the center-frequency of the reference SSB of the serving cell
        the SCS of the reference SSB to be measured = the SCS of the reference SSB of the serving cell
    UE: RSRP of the reference SSB is below threshold2, measure the reference SSBs of the neighbor cells indicated in SIB5 and other SIB (for E-UTRA)
        For the neighbor cells indicated in SIB5, the center-frequency of the reference SSB to be measured = ARFCN indicated in SIB5
        For the neighbor cells indicated in SIB5, SCS of the reference SSB to be measured = SCS indicated in SIB5
        For E-UTRA neighioor cells, the center-frequency of the neighbor cell to be measured = ARFCN indicated in the relevant SIB
        For E-UTRA neighbor cells, SCS of the neighbor cell to be measured = hardcoded value in the specification
Connected mode UE
    UE <-> GNB: RRC connection setup
    UE <- GNB: RRC message for measurement configuration
        NR MO(Measurement object) is associated with ARFCN, SCS and PCI range
        E-UTRA MO is associated with ARFCN
    UE measures NR SSB using indicated ARFCN, SCS and PCI range
    UE measures E-UTRA CRS using indicated ARFCN According to the disclosure, when the NR core network (5G or NR NG core) can be connected to both the eNB using LTE RAT and the eNB using the NR RAT in the next-generation mobile communication system, the UE should be simultaneously connected to the 5G CN (NR core network) and the EPC (LTE core network). The eNB using the LTE RAT can be connected to the LTE core network and the eNB using the NR RAT can be connected to the NR core network.

The UE should be able to use an Evolved Packet Core (EPC) and a 5G Core Network (CN) Non Access Stratum (NAS). This is because the UE may be connected to both the eNB using the LTE RAT and the eNB using the NR RAT and each eNB may be connected to both the LTE core network and the NR (5G) core network as described above. For example, when the UE which can be connected to the 5G CN is connected to the network, the UE can always select the 5G CN NAS. However, the 5G CN may not support a particular function (for example, an MBMS) supported by the EPC of LTE. On the other hand, when the UE which can be connected to the EPC is connected to the network, the UE may always select the EPC. However, the EPC may not support QoS or a slice (RAN slice or network slice) service supported by the 5G CN. Further, the UE registered in the EPC and the UE registered in the 5G CN may receive different services even though the UEs are the same UE. Accordingly, the UE registered in the 5G CN may be required to reestablish the EPC as necessary. The disclosure proposes a method by which, when the UE performs handover from a source eNB to a target eNB, the source eNB selects a cell of the target eNB connected to a particular core network (EPC or 5G CN) and hands over the UE.

Figure 13:
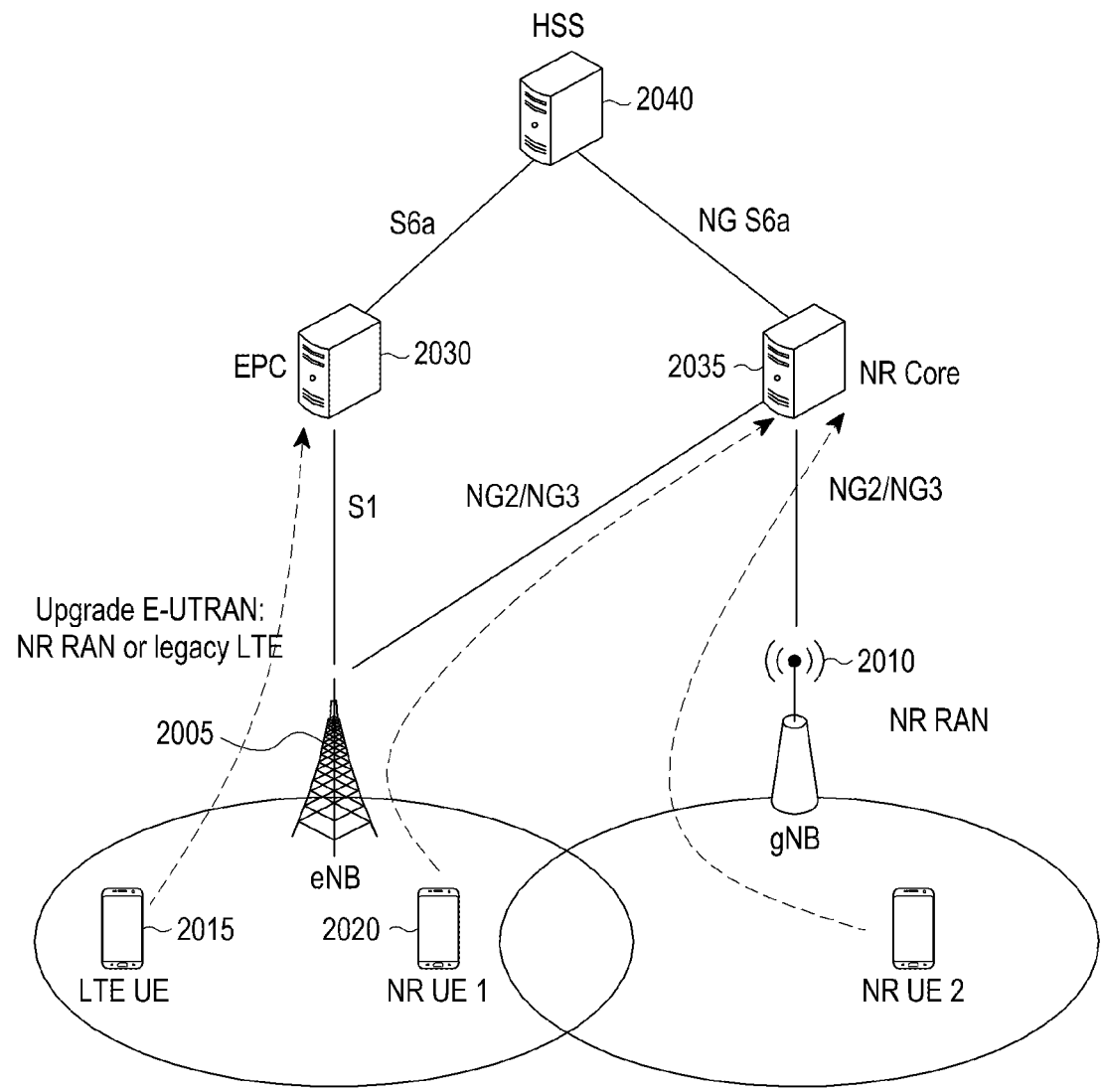
FIG. 13 illustrates a method by which the UE is connected to an EPC (LTE core network) and a 5G CN (5G core network or NR core network) in the next-generation mobile communication system according to the disclosure.

FIG. 13 illustrates a method by which the UE is connected to the EPC (LTE core network) and the 5G CN (5G core network or NR core network) in the next-generation mobile communication system according to the disclosure.

As illustrated in FIG. 13, in the next-generation mobile communication system, a 5G core network 2035 can be connected to an eNB 2005 using LTE RAT and a gNB 2010 using NR RAT, and UEs 2020 and 2025, which can be connected to the 5G CN should be able to be connected to each of the 5G CN 2035 and the EPC 2030. That is, the UEs should be able to be connected to both the EPC and the Non Access Stratum (NAS) of the 5G CN.

When the UE which can be connected to the 5G CN is connected to the network, the UE can always select the 5G CN NAS. However, the 5G CN may not support a particular function (for example, MBMS) supported by the EPC of LTE (inversely, the EPC of LTE may not support a function such as a slice (network slice or RAN slice) provided by the 5G CN). The slice function may be a service for specializing any service and providing a dedicated network, radio access transmission resources, or a dedicated data link to satisfy QoS or requirements suitable for the service, and a plurality of slices may be configured in a core network (Non-Access Stratum (NAS) or radio access technology (Access Stratum (AS)). Further, the UE registered in the EPC and the UE registered in the 5G CN may receive different services even though the UEs are the same UE. Accordingly, even the UE registered in the 5G CN may be required to reestablish the EPC as necessary, and inversely even the UE registered in the EPC may be required to reestablish the 5G CN as necessary. Further, an LTE UE 2015 having only EPC-connectable UE capability may receive a service only through the connection to the EPC.

For the connection of the eNB to both the 5G CN and the EPC, a new 5G eNB (gNB) should be used or the eNB, which is the conventional LTE eNB (for example, eLTE eNB or enhanced LTE eNB), should be upgraded for the connection to the 5G CN.

The CN according to the disclosure may include a CN supporting 5G and a hybrid CN supporting different RATs such as 5G and LTE.

Figure 15:
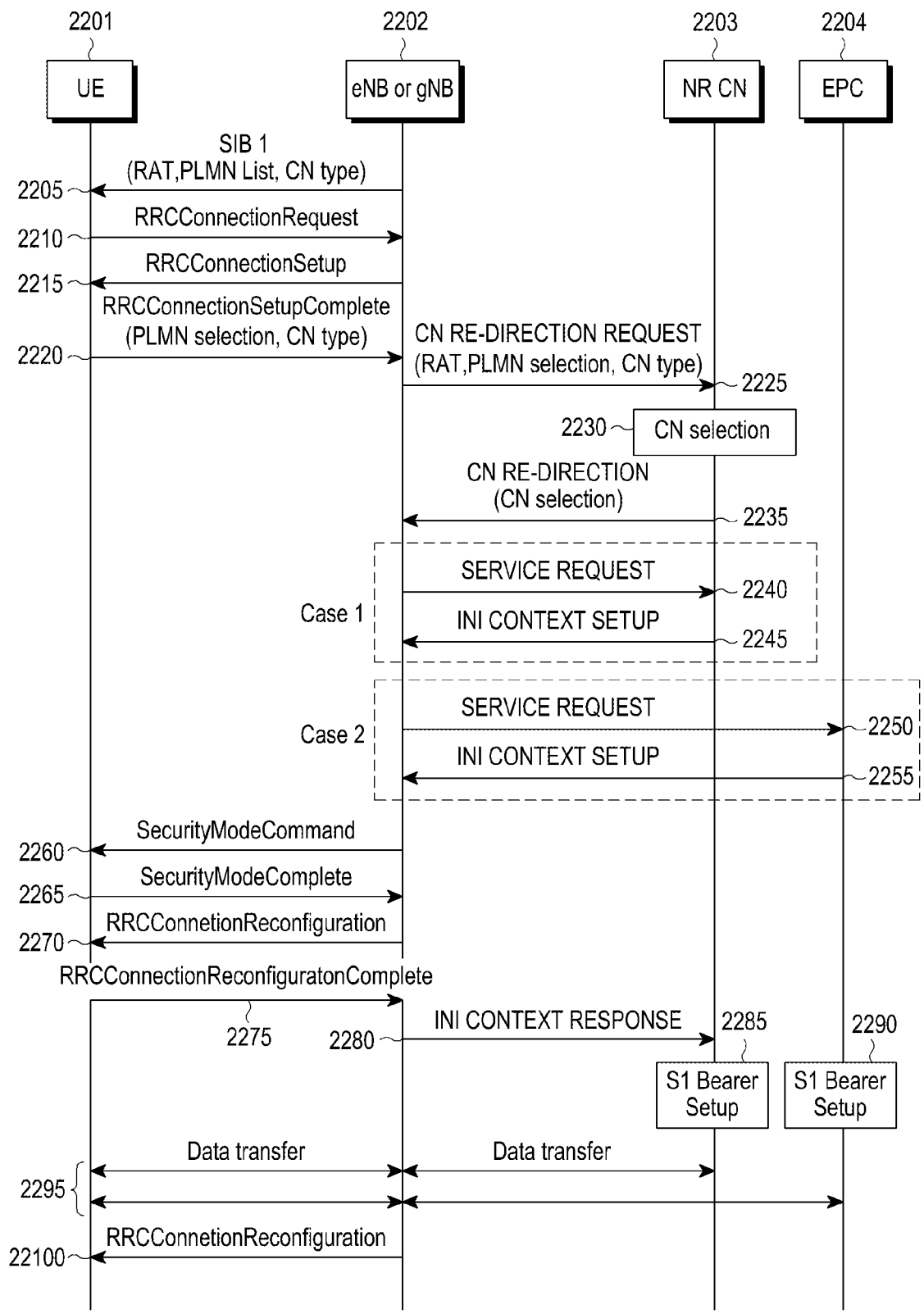
FIG. 15 illustrates a first embodiment of a method of efficiently selecting and reselecting a core network (EPC or 5G CN) by an initial accessed UE proposed by the disclosure.

When the UE can access both the EPC and the 5G CN when performing handover in the state illustrated in FIG. 15 according to the disclosure, a process in which the UE or the source eNB selects the EPC or the 5G CN, a process in which the UE registered in the 5G CN reestablishes the EPC as necessary, or a process in which the UE registered in the EPC establishes the 5G CN as necessary, that is, a core network selection/reselection process is specified. A detailed operation will be described in more detail in the following embodiment.

Figure 14:
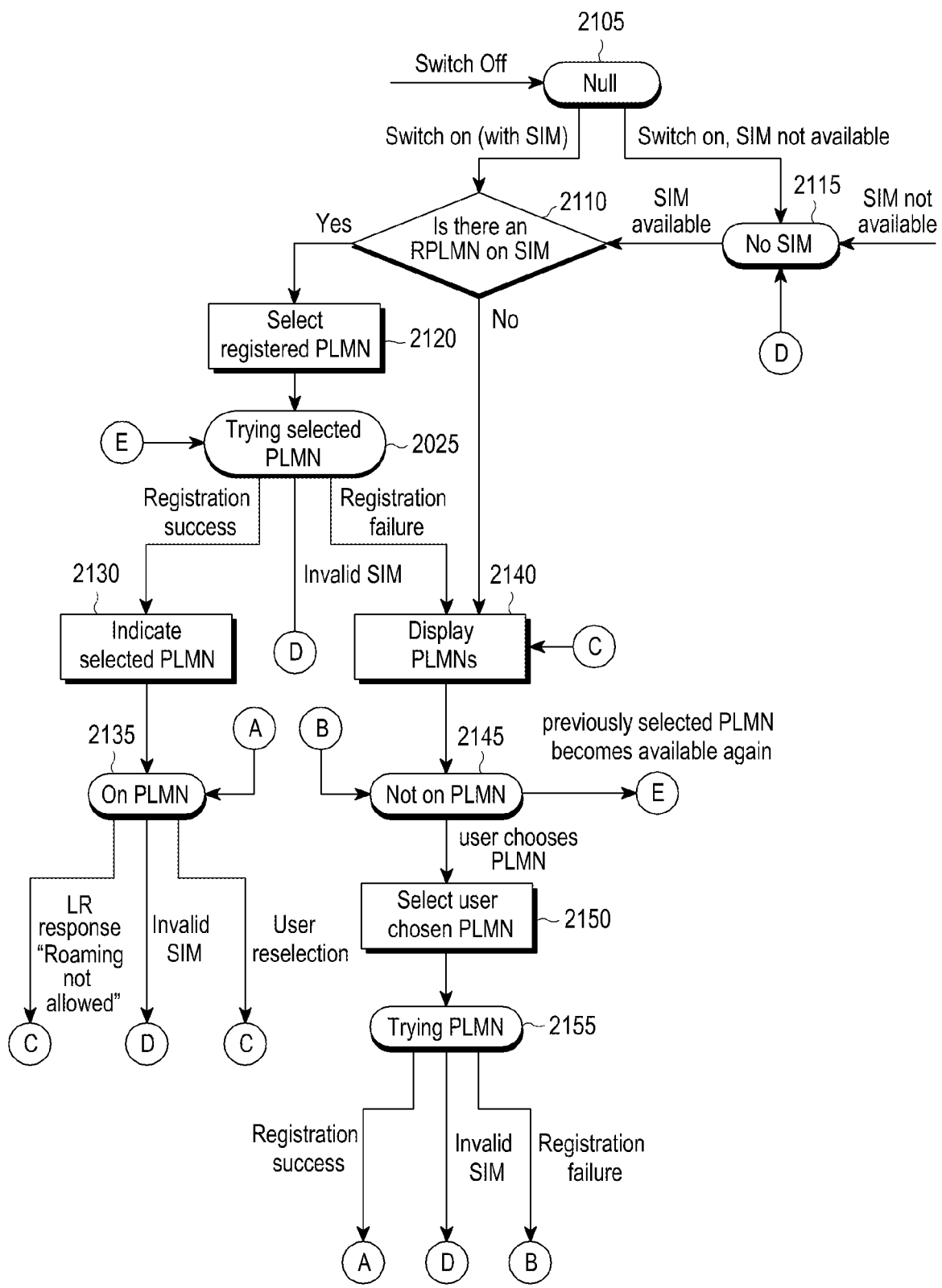
FIG. 14 illustrates a first embodiment of a PLMN selection method of the UE proposed by the disclosure.

FIG. 14 illustrates a first embodiment of a method of selecting a PLMN by the UE proposed by the disclosure, in which the UE selects a preferred CN type or slice type and indicates the result thereof so as to establish a core network (5G CN or EPC).

The method of searching for and determining a PLMN according to the first embodiment of disclosure is automatically performed by an Access Stratum (AS) or triggered through and manually performed by the NAS. In general, the UE operates on a Home PLMN (HPLMN) or an Equivalent Home PLMN (EHPLMN), but a VPLMN may be selected. Basically, the AS layer reports all pieces of PLMN-related information including a list of connectable PLMNs to the NAS and performs an additional PLMN selection operation on the basis of priority information.

For PLMN selection, the UE scans E-UTRA bands through all RF channels suitable for capability, searches for valid PLMNs, reads system information in a cell having the highest signal strength, and performs a PLMN selection process according to a PLMN list provided by the cell.

A basic PLMN selection process in a manual mode is described. When the UE is turned on in step 2105, the UE identifies whether there is a Registered PLMN (RPLMN) around the UE in step 2110. If the turned-on UE does not have a Subscriber Identity Module (SIM) or the SIM is not valid, the UE maintains the state before the SIM becomes valid in step 2115. When the UE found the RPLMN and selects the PLMN in step 2120, the UE attempts access to the corresponding PLMN in step 2125. When the UE completely succeeds in registration and connection, the UE indicates the connected PLMN in step 2130 and performs a service in the corresponding PLMN in step 2135. However, when the registration and connection are failed in step 2140, the UE cannot be connected to the corresponding PLMN in step 2145 and attempts access to the PLMN, which is selected on the basis of the priority in step 2150, in step 2155.

The PLMN selection process based on the priority follows the following priority.
1. Select a high-priority EHPLMN if there is an EHPLMN list and select an HPLMN if there is no EHPLMN list.
2. Select a set of PLMNs stored in a SIM and controlled by a UE.
3. Select a set of PLMNs stored in a SIM and controlled by a service provider.
4. A set of PLMNs having high received signal performance (determined in random order)
5. A set of PLMNs arranged in descending order of received signals (1) Available HPLMN list
(2) Available PLMN/access technology list from the user controlled SIM data file
(3) Available PLMN/access technology list from the operator controlled SIM data file
(4) Available PLMN/access technology list with the highest received signal
(5) Available PLMN/access technology list in order of decreased signal quality FIG. 15 illustrates a method on efficient core network (EPC or 5G CN) selection/reselection method of the initial accessed UE according to a first embodiment proposed by the disclosure.

Referring to FIG. 15, a UE 2201 has UE capability to access both the 5G CN and the EPC. The UE 2201 performs an initial cell search, camps on the cell, and receives system information (for example, SIB 1) in step 2205, and identifies whether the corresponding cell is an HPLMN. The cell 2202 may be a 5G eNB (gNB), an LTE eNB, or an upgraded eLTE eNB having capability to access the 5G CN. The system information for example, SIB 1) may include Radio Access Technology (RAT) information (for example, 5G RAT or LTE RAT) indicating which RAT is used, a PLMN list (for example, a PLMN list corresponding to the RATs), and a connectable CN type (for example, a CN type which can be applied to each PLMN, that is, a 5G CN or an EPC). The system information may include a slice type (for example, a slice type provided by the CN type) information. As the RAT information, the PLMN list, and the CN type information are provided through the system information, RAT information, the PLMN list, the CN type, or the slice information, which the initial accessed UE can access, may be detected and preferred RAT information, PLMN list, CN type, or slice information suitable for the service which the UE desires to currently receive may be selected. In the next-generation mobile communication system, even the UE registered in the 5G CN may be required to reestablish the EPC as necessary (or inversely, the UE registered in the EPC may be required to reestablish the 5G CN as necessary), so that it is possible to provide a CN type or a slice type according to each radio access and each PLMN for a core network (CN) reestablishment function. When the system information is received, the UE selects a PLMN, camps on the selected PLMN, and receives the remaining system information. The PLMN determination method may be determined on the basis of a first embodiment of a PLMN selection method of the UE illustrated in FIG. 22.

The PLMN selection method of the UE may be determined on the basis of a second embodiment of the PLMN selection method of the UE proposed below rather than the first embodiment of the PLMN selection method of UE according to the disclosure.

The method of searching for and determining the PLMN according to the second embodiment of the PLMN selection method of the UE according to the disclosure may automatically performed by an Access Stratum (AS) or triggered through and manually performed by the NAS. In general, the UE operates on a Home PLMN (HPLMN) or an Equivalent Home PLMN (EHPLMN), but a VPLMN may be selected. Basically, the AS layer reports all pieces of PLMN-related information including RAT information (for example, 5G RAT or LTE RAT) indicating which RAT is used, a list of connectable PLMNs (for example, a list of PLMNs corresponding to the RATs), connectable CN type (for example, CN type which can be applied to each PLMN, that is, the 5G CN or the EPC) or slice type (for example, slice type provided by the CN type information to the NAS and performs an additional PLMN selection operation on the basis of priority information. That is, for the PLMN selection, the UE scans E-UTRA bands through all RF channels suitable for capability, searches for valid PLMNs, reads system information in a cell having the highest signal strength, and performs a PLMN selection process according to a PLMN list provided by the cell.

The UE may perform a procedure similar to the first embodiment of the PLMN selection method of the UE. However, the UE may select the PLMN on the basis of the following priority and attempt access.

In the disclosure, the PLMN selection process based on the priority according to the second embodiment of the PLMN selection method of the UE follows the following priority.

1. Select a high-priority EHPLMN if there is an EHPLMN list and select an HPLMN if there is no EHPLMN list.
2. Select a set of PLMNs/RATs/CN types stored in a SIM and controlled by a UE.
3. Select a set of PLMNs/RATs/CN types stored in a SIM and controlled by a service provider.
4. Select a set of PLMNs stored in the SIM and controlled by the UE.
5. Select a set of PLMNs stored in a SIM and controlled by a service provider.
6. A set of PLMNs having high received signal performance (determined in random order)
7. A set of PLMNs arranged in descending order of received signals
   (1) Available HPLMN list
   (2) Available PLMN/access technology/CN type list from the user controlled SIM data file
   (3) Available PLMN/access technology/CN type list from the operator controlled SIM data file
   (4) Available PLMN/access technology list from the user controlled SIM data file
   (5) Available PLMN/access technology list from the operator controlled SIM data file
   (6) Available PLMN/access technology list with the highest received signal
   (7) Available PLMN/access technology list in order of decreased signal quality In the disclosure, the PLMN selection process based on the priority according to a third embodiment of the PLMN selection method of the UE follows the following priority.

1. Select a high-priority EHPLMN if there is an EHPLMN list and select an HPLMN if there is no EHPLMN list.
2. Select a set of PLMNs/RATs/CN types/slice types stored in a SIM and controlled by a UE.
3. Select a set of PLMNs/RATs/CN types/slice types stored in a SIM and controlled by a service provider.
4. Select a set of PLMNs stored in the SIM and controlled by the UE.
5. Select a set of PLMNs/RATs/CN types stored in a SIM and controlled by a service provider.
6. Select a set of PLMNs stored in the SIM and controlled by the UE.
7. Select a set of PLMNs stored in a SIM and controlled by a service provider.
8. A set of PLMNs having high received signal performance (determined in random order)
9. A set of PLMNs arranged in descending order of received signals
   (1) Available HPLMN list
   (2) Available PLMN/access technology/CN type list/ slice type from the user controlled SIM data file (3) Available PLMN/access technology/CN type list/ slice type from the operator controlled SIM data file (4) Available PLMN/access technology/CN type list from the user controlled SIM data file (5) Available PLMN/access technology/CN type list from the operator controlled SIM data file (6) Available PLMN/access technology list from the user controlled SIM data file (7) Available PLMN/access technology list from the operator controlled SIM data file (8) Available PLMN/access technology list with the highest received signal (9) Available PLMN/access technology list in order of decreased signal quality According to the second embodiment and the third embodiment of the PLMN selection method of the UE, the UE may select preferred RAT, PLMN list, CN type, and slice type suitable for the service which the UE desires to receive in consideration of information such as RAT, PLMN list, CN type, and slice type. For example, if there is a preferred CN type, the UE may select a PLMN and RAT supporting the preferred CN type, and if there is a preferred slice type, may select a CN type, a PLMN, and RAT supporting the preferred slice type.

If data to be transmitted is generated by a UE of which connection is not currently configured (hereinafter, referred to as an idle-mode UE), the UE performs an RRC connection establishment process with the eNB. The UE establishes backward transmission synchronization with the eNB through a random access process and transmits an RRCConnectionRequest message to the eNB in step 2210. The message includes a reason (establishmentCause) to establish the connection with an identifier of the UE.

The eNB transmits an RRCConnectionSetup message to allow the UE to establish the RRC connection in step 2215. The message includes RRC connection configuration information. The RRC connection is also referred to as a Signaling Radio Bearer (SRB), and is used for transmitting and receiving an RRC message which is a control message between the UE and the eNB.

The UE establishing the RRC connection transmits an RRCConnectionSetupComplete message to the eNB in S2220. The message may include a control message corresponding to a service request by which the UE makes a request for establishing a bearer for a predetermined service to the MME. The UE may insert the PLMN which the UE prefers, CN type information, and slice information into the message.

In the disclosure, the service request control message may include both an indicator indicating the selected PLMN and CN type information or slice type information in the corresponding PLMN. The eNB transmits a service request message 2240 or a CN re-direction request control message 2225 including the PLMN indicator or CN type information, which is included in the RRCConnectionSetupComplete message to the currently connected MME (in the embodiment, the connection to the 5G CN is assumed. In the case of the connection to the EPC, all the following processes may be performed on the basis of the EPC rather than the 5G CN).

The CN re-direction request control message 2225 may be transmitted while including the same content as that of the service request message 2240, and the CN receiving the control message selects a proper CN according to a predetermined method in step 2230. The selection may be determined according to a predetermined priority or may be determined according to a UE type and establishmentCause, that is, a service type.

The initially configured CN determines whether to maintain the current CN connection or receive a change to another CN, inserts the result thereof into the CN re-direction control message, and transmits the CN re-direction control message to the eNB in step 2235. In such a process, the eNB may identify preference of the UE and determine configuration of/connection to the 5G CN or the EPC or reconfiguration of/reconnection to the 5G CN or the EPC. Alternatively, in the process, the MME may identify preference of the UE and determine configuration of/connection to the 5G CN or the EPC or reconfiguration of/reconnection to the 5G CN or the EPC. Alternatively, in the process, the core network may identify preference of the UE and determine configuration of/connection to the 5G CN or the EPC or reconfiguration of/reconnection to the 5G CN or the EPC.

The CN re-direction control message 2235 may be transmitted while including only information on the determined CN or being included in an initial context setup message 2245, or may be transmitted while including information which should be included in the initial context setup message 2245. If the CN should be changed, the eNB transmits, to the CN, which should be changed (the EPC in this example), a control message 2250 corresponding to a service request for making a request for establishing a bearer for a predetermined service of the UE to the MME, and the MME determines whether to provide the service requested by the UE. If it is determined to provide the service requested by the UE on the basis of the determination result, the MME transmits an initial context setup request message 2255 to the eNB. The message includes Quality of Service (QoS) information to be applied to Data Radio Bearer (DRB) configuration and security-related information to be applied to the DRB (for example, a security key and a security algorithm).

The eNB exchanges a SecurityModeCommand message 2260 and a SecurityModeComplete message 2265 with the UE in order to set security. When security has been completely set, the eNB transmits an RRCConnectionReconfiguration message to the UE in step 2270. The message includes configuration information of the DRB for processing user data, and the UE configures the DRB by applying the information and transmits an RRCConnectionReconfigurationComplete message to the eNB in S2275.

The eNB completely establishing the DRB with the UE transmits an initial context setup complete message to the MME in step 2280, and the MME receiving the initial context setup complete message exchanges an S1 bearer setup message and an S1 bearer setup response message in order to establish an S1 bearer with the S-GW. The S1 bearer is a connection for data transmission established between the S-GW and the eNB and corresponds to the DRB in one-to-one correspondence in step 2285 or 2290. When the process is completed, the UE transmits and receives data to and from the eNB through the S-GW in step 2295. As described above, the general data transmission process largely consists of three steps such as RRC connection setup, security setup, and DRB setup. Further, the eNB may transmit an RRCConnectionReconfiguration message in order to provide new configuration to the UE or add or change the configuration for a predetermined reason in step 22100.

Figure 16A:
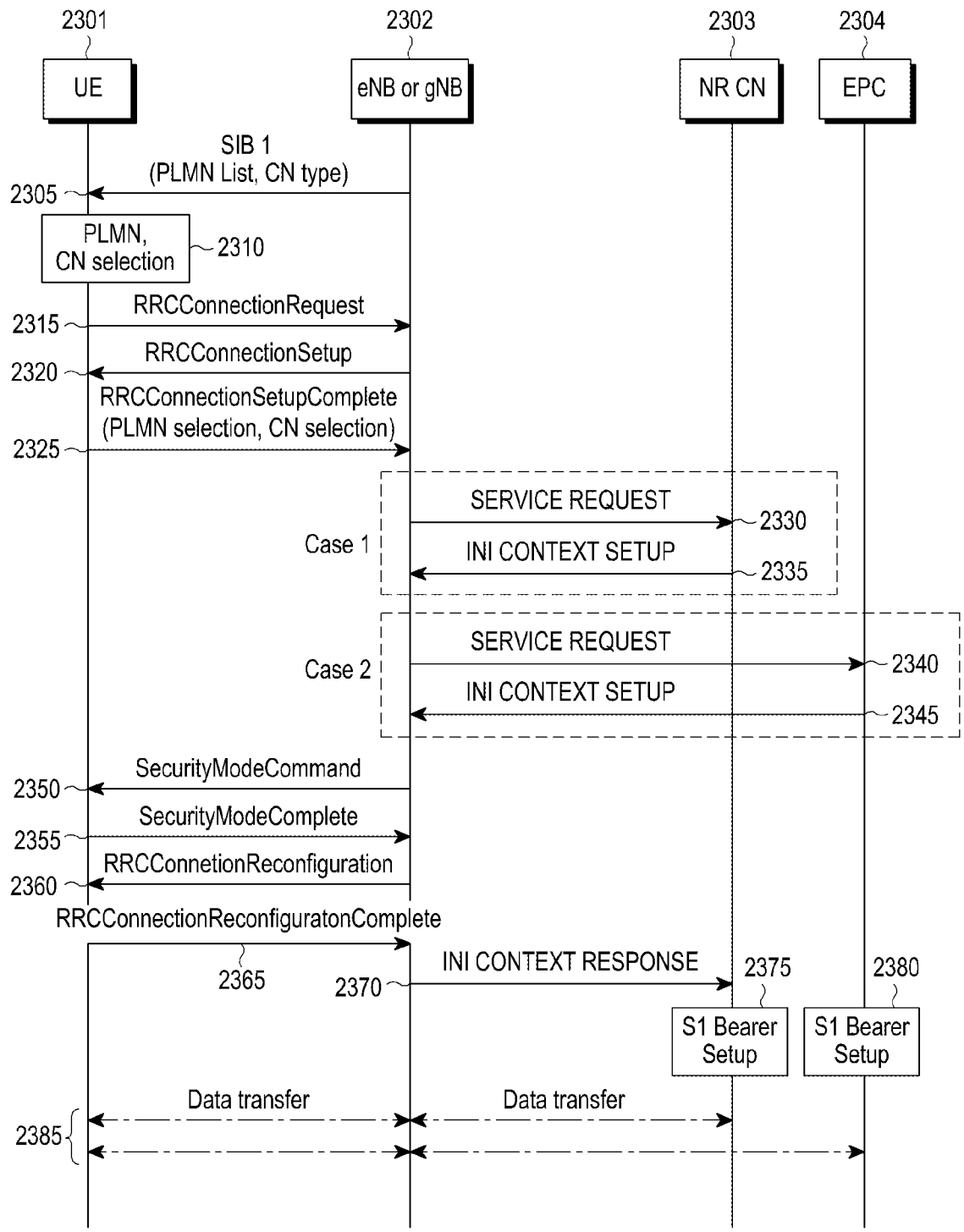
FIGS. 16A and 16B illustrate a second embodiment of the PLMN selection method of the UE proposed by the disclosure.
Figure 16B:
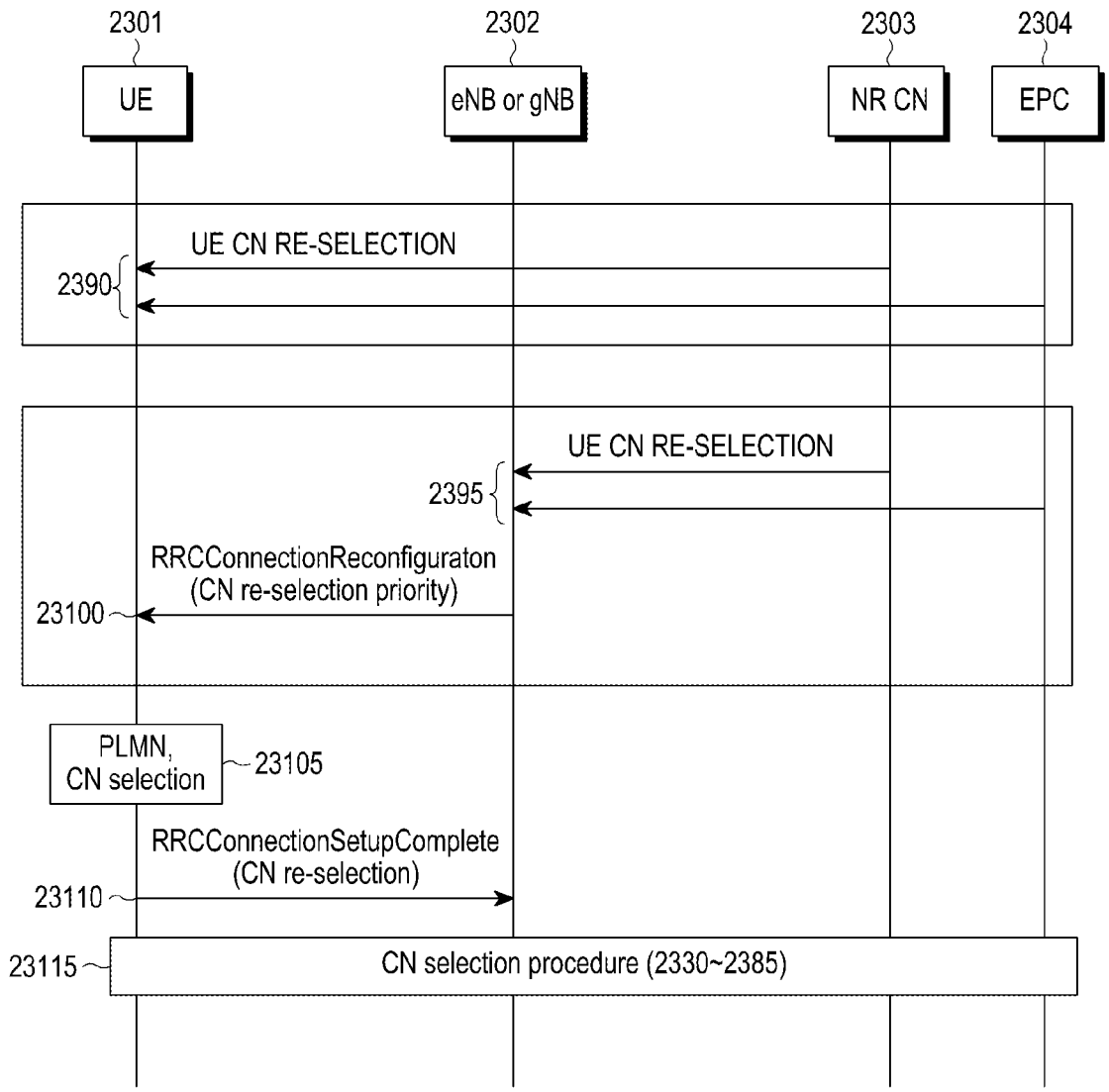

FIGS. 16A and 16B illustrate a second embodiment of the PLMN selection method of the UE proposed by the disclosure. The lower part of FIG. 16 is connected to the upper part of FIG. 16A. Hereinafter, FIGS. 16A and 16B are collectively referred to as FIG. 16.

FIG. 16 corresponds to the second embodiment proposed by the disclosure and illustrates a method by which the UE selects a preferred CN type or slice type and indicates the result thereof so as to establish a core network (5G CN or EPC).

In FIG. 16, a UE 2301 is a UE having capability for the connection to NR, and receives SIB 1 for an initial cell search in step 2305 and identifies whether the corresponding cell is an HPLMN. The cell 2302 may be an NR eNB (gNB), an LTE eNB, or an upgraded eLTE eNB having capability to access the 5G CN.

The system information (for example, SIB 1) may include a PLMN list and a CN type or a slice type which can be applied to each PLMN. That is, the system information may include Radio Access Technology (RAT) information (for example, RAT may be 5G RAT or LTE RAT, but is not limited thereto) indicating which RAT is used, a PLMN list (for example, a PLMN list corresponding to the RATs), and a connectable CN type (for example, a CN type which can be applied to each PLMN, that is, a 5G CN or an EPC). Further, the system information may include slice type (for example, slice type provided by the CN type) information.

As the RAT information, the PLMN list, and the CN type information are provided through the system information, RAT information, the PLMN list, the CN type, or the slice information, which the initial accessed UE can access, may be detected and preferred RAT information, PLMN list, CN type, or slice information suitable for the service which the UE desires to currently receive may be selected.

In the next-generation mobile communication system, even the UE registered in the 5G CN may be required to reestablish the EPC as necessary (or inversely, the UE registered in the EPC may be required to reestablish the 5G CN as necessary), so that it is possible to provide a CN type or a slice type according to each RAT and each PLMN for a core network (CN) reestablishment function.

When the UE receives the system information in step 2320, the UE selects a PLMN, camps on the selected PLMN, and receives the remaining system information. The PLMN determination method may be determined on the basis of a priority according to the first embodiment, the second embodiment, or the third embodiment of the PLMN selection method of the UE proposed above. Thereafter, the UE may determine a CN value in the corresponding PLMN according to the CN priority recorded in the SIM or CN priority information according to each PLMN. Alternatively, the priority information may be received through a NAS message and a value thereof may be managed as a black list by the UE. That is, the UE may determine and store the priority of the PLMN and the CN through previous access and reception of the NAS message. Further, in the step, the UE may simultaneously select the PLMN and the CN. A condition for the selection may be variously implemented.

If data to be transmitted is generated by a UE of which connection is not currently configured (hereinafter, referred to as an idle-mode UE), the UE performs an RRC connection establishment process with the eNB. The UE establishes backward transmission synchronization with the eNB through a random access process and transmits an RRCConnectionRequest message to the eNB in step 2315. The message includes a reason (establishmentCause) to establish the connection with an identifier of the UE. The eNB transmits an RRCConnectionSetup message to allow the UE to establish the RRC connection in step 2320. The message includes RRC connection configuration information. The RRC connection is also referred to as a Signaling Radio Bearer (SRB), and is used for transmitting and receiving an RRC message which is a control message between the UE and the eNB.

The UE establishing the RRC connection transmits an RRCConnectionSetupComplete message to the eNB in S2320. The message may include a control message corresponding to a service request by which the UE makes a request for establishing a bearer for a predetermined service to the MME. In the disclosure, the service request control message includes indicator indicating selected radio access or PLMN and CN type or slice type.

The eNB transmits a service request message 2330 or 2340 included in the RRCConnectionSetupComplete message to the currently connected MME (in the embodiment, the connection to the 5G CN is assumed. In the case of the connection to the EPC, all the following processes may be performed on the basis of the EPC rather than the 5G CN). The service request control message 2330 or 2340 may be selected according to a preferred CN type or a preferred slice type determined by the UE and transmitted to the corresponding CN (5G CN or EPC). The service request control message 2330 or 2340 includes a request from the UE for establishing a bearer for a predetermined service to the MME, and the MME determines whether to provide the service requested by the UE.

If it is determined to provide the service requested by the UE on the basis of the determination result, the MME transmits an initial context setup request message 2335 or 2345 to the eNB. The message includes Quality of Service (QoS) information to be applied to Data Radio Bearer (DRB) configuration and security-related information to be applied to the DRB (for example, a security key and a security algorithm).

The eNB exchanges a SecurityModeCommand message 2350 and a SecurityModeComplete message 2355 with the UE in order to set security. When security has been completely set, the eNB transmits an RRC connection reconfiguration message to the UE in step 2360. The message includes configuration information of the DRB for processing user data, and the UE configures the DRB by applying the information and transmits an RRC connection reconfiguration complete message to the eNB in S2365.

The eNB completely establishing the DRB with the UE transmits an initial context setup complete message to the MME in step 2370, and the MME receiving the initial context setup complete message exchanges an S1 bearer setup message and an S1 bearer setup response message in order to establish an S1 bearer with the S-GW. The S1 bearer is a connection for data transmission established between the S-GW and the eNB and corresponds to the DRB in one-to-one correspondence in step 2375 or 2380.

When the process is completed, the UE transmits and receives data to and from the eNB through the S-GW in step 2385. As described above, the general data transmission process largely consists of three steps such as RRC connection setup, security setup, and DRB setup. For a particular reason, the current CN may make a request for a CN change to the UE. At this time, a condition for the CN change is that the currently connected CN cannot support a particular service requested by the UE or to provide a better service. For the reason, the MME may transmit a UE CN re-selection control message 2390 to the UE or transmit a UE CN re-selection control message 2395 to the eNB, and then the eNB may transmit a CN re-selection priority through an RRC connection reconfiguration message in step 23100.

The UE receiving the NAS control message or the RRC control message performs a procedure for reselecting the CN again on the basis of the CN re-selection priority in step 23105. That is, instead of the RRC messages of steps 2315 to 2325, a new RRC message or an RRC connection reconfiguration complete message which is a response message to the previously received RRC connection reconfiguration message may include CN re-selection information and then may be transmitted to the eNB in step 23110. Thereafter, the procedure for CN reselection may be performed, which may include all procedures for CN connection setup and data transmission/reception and may be mapped to steps 2330 to 2385 in step 23115.

The disclosure proposes the procedure for allowing the initial accessed UE (RRC idle-mode UE) to access the eNB or the cell connected to a CN type (5G CN or EPC) preferred to supported by the UE when the UE accesses the network.

Thereafter, the disclosure proposes a procedure in which, when the RRC-connected mode UE performs handover from a source eNB (source cell) to a target eNB (target cell) in the network, the UE selects a target cell connected to a CN type (5G CN or EPC) preferred by the UE, suitable for a service, or preferred by the source eNB to perform the handover.

Figure 17:
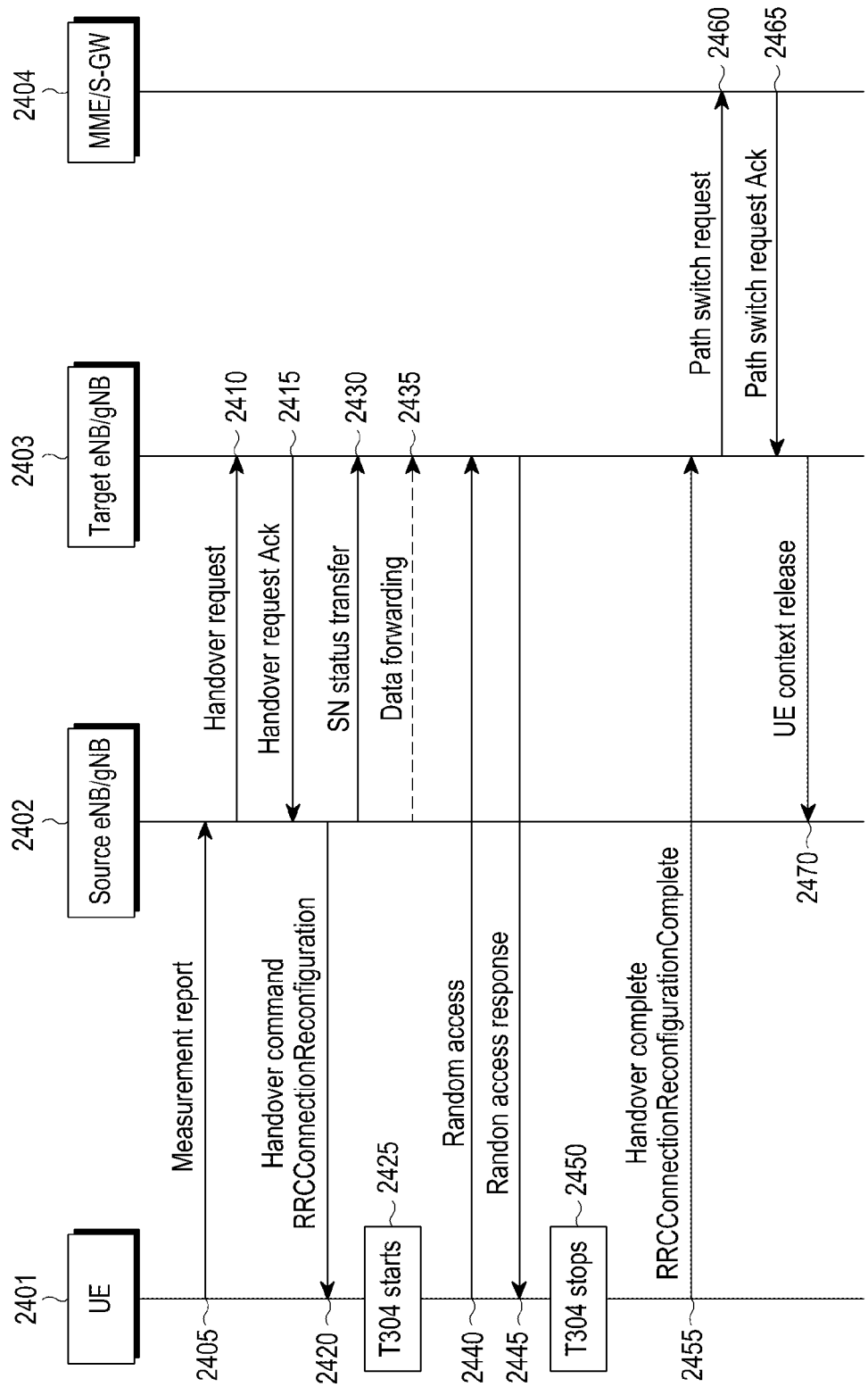
FIG. 17 illustrates a first embodiment in which the RRC-connected mode UE performs handover from a source eNB to a target eNB according to the disclosure.

FIG. 17 illustrates a first embodiment in which the RRC-connected mode UE performs handover from a source eNB to a target eNB according to the disclosure.

Referring to FIG. 17, when a periodic or a particular event is satisfied in a current source eNB 2402, a connected-mode UE 2401 performs cell measurement on the conventionally accessed cell or other cells and reports cell measurement information (measurement report) including identifier of the measured cells and the measurement result (for example, absolute or relative signal strength) to the source eNB in step 2405.

The source eNB determines whether to hand over the UE to an adjacent cell on the basis of the measurement information. The handover is technology for switching a source eNB, which provides a service to the connected-mode UE, to another eNB.

When the source eNB determines to perform the handover, the source eNB transmits a handover (HO) request message to a new eNB, that is, a target eNB to provide a service to the UE and make a request for the handover in step 2410.

The handover request message may include a target cell identifier indicating a cell of the target eNB to which the UE is handed over and asks the target eNB about if the handover is possible while making a request for preparing the handover to the target cell.

When the target eNB accepts the handover request, the target eNB transmits a handover request acknowledgement message (HO request ack message) to the source eNB 2415. If the target eNB cannot prepare the handover to the requested target cell in the handover request message for a predetermined reason (for example, lack of transmission resources), the target eNB may transmit a handover preparation failure message to the source eNB to reject the handover request. The source eNB receiving the handover request acknowledgement (ack) message transmits a HO command message to the UE in step 2420.

The HO command message is transmitted from the source eNB to the UE through an RRC connection reconfiguration message and may indicate a target cell to which the UE is handed over through a target cell identifier in step 2420. Upon receiving the message, the UE stops data transmission and reception to and from the source eNB and starts a timer T304. When the handover of the UE to the target eNB is not successful for a predetermined time, T304 returns the UE to the original configuration and switches the UE to the RRC idle state.

The source eNB transmits a PDCP sequence number (or count value) status (Sequence Number (SN) status) of uplink/downlink data, and if there is downlink data, transmits the downlink data to the target eNB in steps 2430 and 2435. The UE attempts random access to the target cell instructed by the source eNB in step 2440.

The random access is to inform the target cell that the UE moves through the handover and also to synchronize uplink. For the random access, the UE transmits a preamble corresponding to a preamble ID received from the source eNB or a randomly selected preamble ID to the target cell.

After transmitting the preamble, the UE monitors whether a Random Access Response (RAR) is transmitted from the target cell after a predetermined number of subframes. A time window during which monitoring is performed is referred to as a Random Access Response (RAR) window. When the RAR is received for a particular time in step 2445, the UE transmits a handover (HO) complete message, which is an RCConnectionReconfigurationComplete message, to the target eNB in step 2455.

As described above, upon successfully receiving the RAR from the target eNB, the UE terminates the timer T304 in step 2450. When the UE successfully receives the RAR before the timer expires, the UE may perform fallback and perform the random access procedure again after a predetermined time from the RRC idle mode.

In order to switch a path of bearers established in the source eNB, the target eNB makes a request for switching the path in steps 2460 and 2465, and notifies the source eNB of deletion of UE context in step 2470. Accordingly, the UE attempts data reception from the target eNB at a RAR window start time point, and after RAR reception, starts data transmission to the target eNB while transmitting an RRC-ConnectionReconfigurationComplete message.

Figure 18:
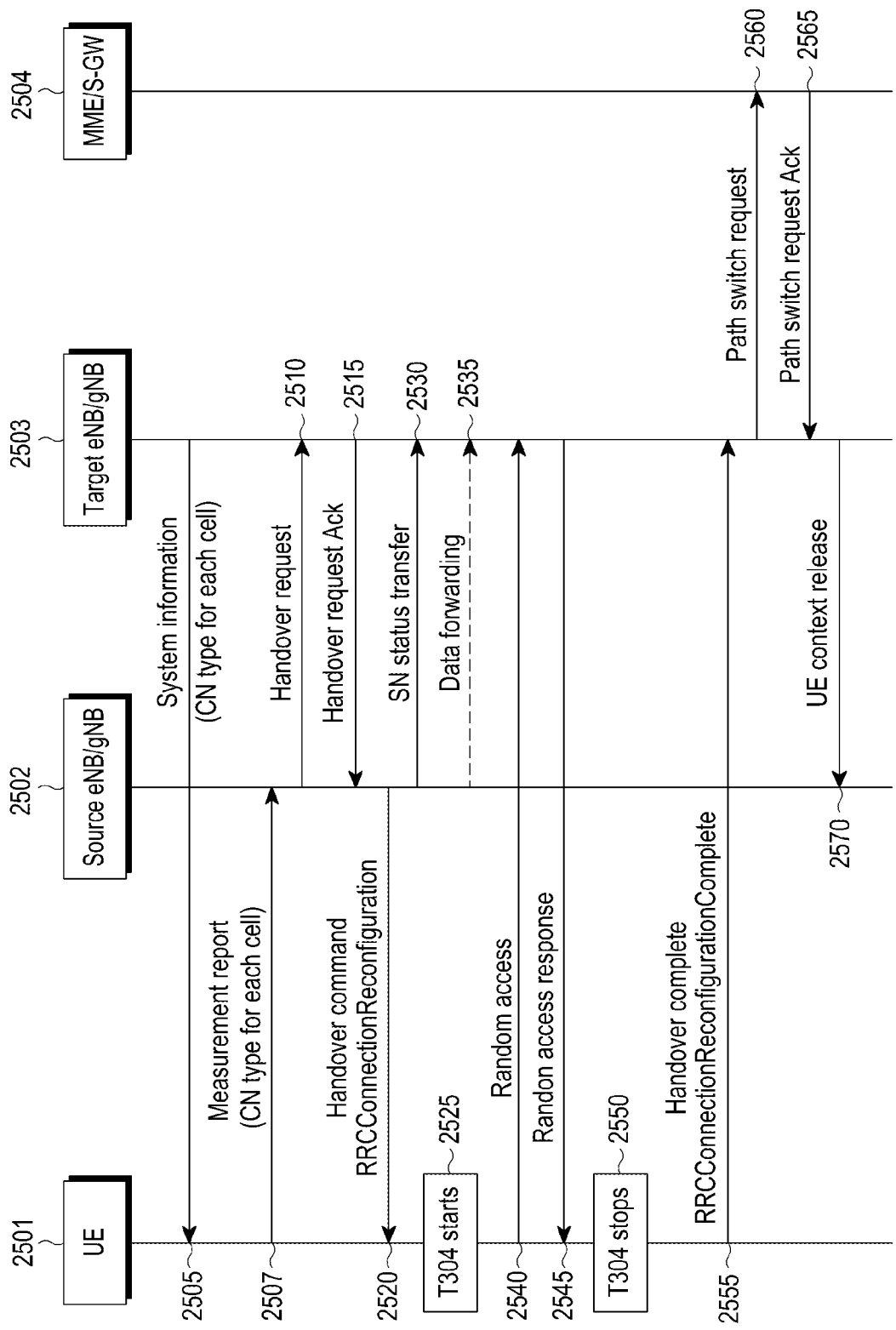
FIG. 18 illustrates a second embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service, or preferred by the source eNB to perform the handover.

FIG. 18 illustrates a second embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service of the UE, or preferred by the source eNB to perform the handover.

Referring to FIG. 18, when a periodic or a particular event is satisfied in a current source eNB 2502, a connected-mode UE 2501 may perform cell measurement on the conventionally accessed cell or other cells, read system information of the corresponding cell, and identify a CN type (5G CN or EPC) to which the corresponding cell is connected in step 2505.

System information of each cell may indicate a CN type (5G CN or EPC) to which the current cell is connected. The UE reports cell measurement information (measurement report) including an identifier of the cell of which the CN type is identified in the system information and the measurement result (for example, absolute or relative signal strength) to the source eNB in step 2507.

Through the cell measurement report, the UE may provide a cell measurement report only on cells connected (corresponding) to a CN type preferred by the UE. The source eNB determines whether to hand over the UE to an adjacent cell on the basis of the measurement information. The handover is technology for switching a source eNB, which provides a service to the connected-mode UE, to another eNB. When the source eNB determines to perform the handover, the source eNB transmits a handover (HO)

request message to a new eNB, that is, a target eNB 2503 to provide a service to the UE and make a request for the handover in step 2510.

The handover request message may include a target cell identifier indicating a cell of the target eNB to which the UE is handed over and asks the target eNB about if the handover is possible while making a request for preparing the handover to the target cell.

Figure 22:
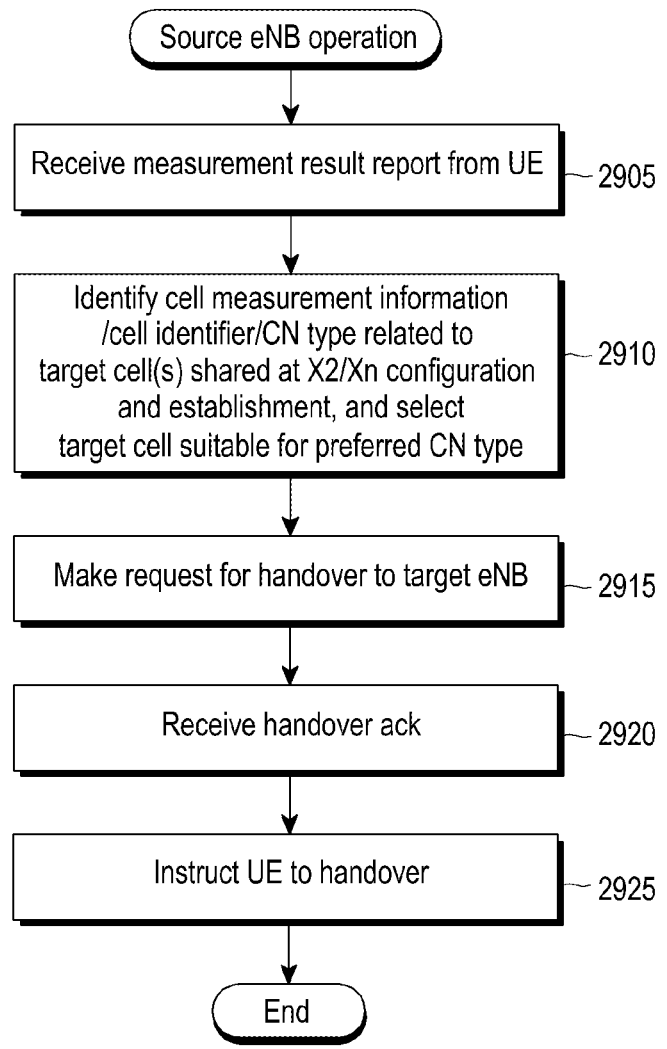
FIG. 22 illustrates the eNB operation according to the third embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service of the UE, or preferred by the source eNB to perform the handover.

When indicating the target cell in the message, the source eNB reflects the CN type preferred by the UE in initial access of the UE as illustrated in FIGS. 22 and 23, and may identify cells and CN types reported by the UE in step 2505 and select and indicate a target cell suitable for the preferred CN type.

When the target eNB accepts the handover request, the target eNB transmits a handover request acknowledgement message (HO request Ack message) to the source eNB 2515. If the target eNB cannot prepare the handover to the requested target cell in the handover request message for a predetermined reason (for example, lack of transmission resources), the target eNB may transmit a handover preparation failure message to the source eNB to reject the handover request.

The source eNB receiving the handover request acknowledgement (ack) message transmits a HO command message to the UE in step 2520. The HO command message is transmitted from the source eNB to the UE through an RRC connection reconfiguration message and may indicate a target cell to which the UE is handed over through a target cell identifier in step 2520.

Upon receiving the message, the UE stops data transmission and reception to and from the source eNB and starts a timer T304. When the handover of the UE to the target eNB is not successful for a predetermined time, T304 returns the UE to the original configuration and switches the UE to the RRC idle state. The source eNB transmits a PDCP sequence number (or count value) status (Sequence Number (SN) status) of uplink/downlink data, and if there is downlink data, transmits the downlink data to the target eNB in steps 2530 and 2535.

The UE attempts random access to the target cell instructed by the source eNB in step 2540. The random access is to inform the target cell that the UE moves through the handover and also to synchronize uplink. For the random access, the UE transmits a preamble corresponding to a preamble ID received from the source eNB or a randomly selected preamble ID to the target cell.

After transmitting the preamble, the UE monitors whether a Random Access Response (RAR) is transmitted from the target cell after a predetermined number of subframes. A time window during which monitoring is performed is referred to as a Random Access Response (RAR) window. When the RAR is received for a particular time in step 2545, the UE transmits a handover (HO) complete message, which is an RCConnectionReconfigurationComplete message, to the target eNB in step 2555. As described above, upon successfully receiving the RAR from the target eNB, the UE terminates the timer T304 in step 2550.

When the UE successfully receives the RAR before the timer expires, the UE may perform fallback and perform the random access procedure again after a predetermined time from the RRC idle mode. In order to switch a path of bearers established in the source eNB, the target eNB makes a request for switching the path in steps 2560 and 2565, and notifies the source eNB of deletion of UE context in step 2570. Accordingly, the UE attempts data reception from the target eNB at a RAR window start time point, and after RAR reception, starts data transmission to the target eNB while transmitting an RRCConnectionReconfigurationComplete message.

Figure 19:
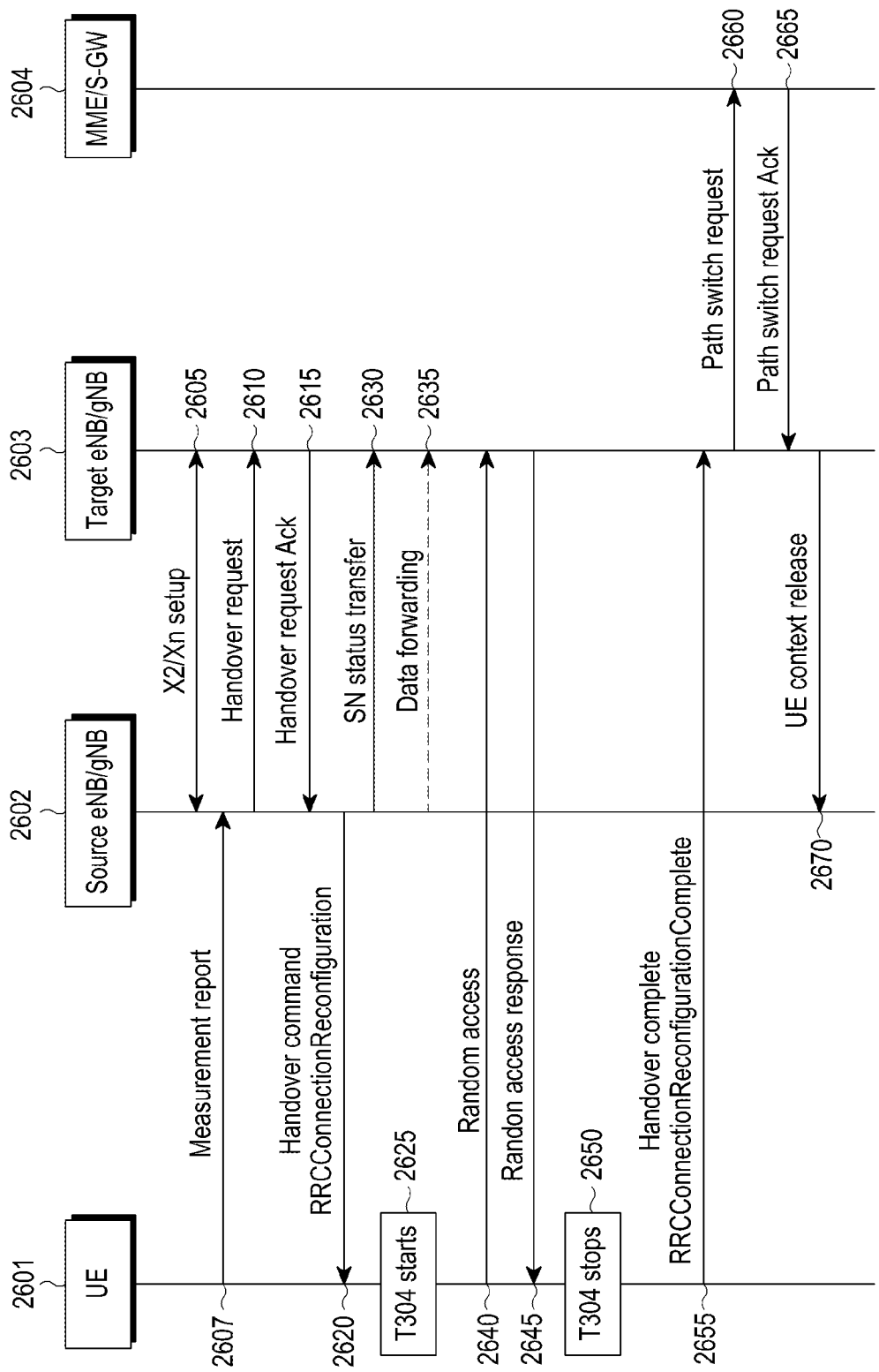
FIG. 19 illustrates a third embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service, or preferred by the source eNB to perform the handover.

FIG. 19 illustrates a third embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service of the UE, or preferred by the source eNB to perform the handover.

Referring to FIG. 19, when a source eNB 2602 and a target eNB 2603 configures and establishes an X2 or an Xn interface, which is a connection interface therebetween, the source eNB 2602 and the target eNB 2603 may share information on cells supported by each eNB (cell identifiers, connected CN types, time/frequency information of cells) in step 2605.

When a periodic or a particular event is satisfied in the current source eNB 2602, a connected-mode UE 2601 performs cell measurement on the conventionally accessed cell or other cells and reports cell measurement information (measurement report) including identifier of the measured cells and the measurement result (for example, absolute or relative signal strength) to the source eNB in step 2607.

The source eNB determines whether to hand over the UE to an adjacent cell on the basis of the measurement information. The handover is technology for switching a source eNB, which provides a service to the connected-mode UE, to another eNB. When the source eNB determines to perform the handover, the source eNB transmits a handover (HO) request message to a new eNB, that is, a target eNB to provide a service to the UE and make a request for the handover in step 2610.

The handover request message may include a target cell identifier indicating a cell of the target eNB to which the UE is handed over and asks the target eNB about if the handover is possible while making a request for preparing the handover to the target cell. The source eNB has already known information on cells supported by the target eNB (cell identifiers, connected CN types, and time/frequency information of cells) by sharing the information in step 2605.

In the disclosure, since the source eNB can be aware of the CN type preferred by the UE like in 4g or 4h, the source eNB may reflect the CN type to select and indicate a target cell connected (corresponding) to the preferred CN type (CN type preferred by the UE or suitable for the service) in the handover request message and ask the target eNB if the handover is possible.

When the target eNB accepts the handover request, the target eNB transmits a handover request acknowledgement message (HO request Ack message) to the source eNB 2615. If the target eNB cannot prepare the handover to the requested target cell in the handover request message for a predetermined reason (for example, lack of transmission resources), the target eNB may transmit a handover preparation failure message to the source eNB to reject the handover request. The source eNB receiving the handover request acknowledgement (ack) message transmits a HO command message to the UE in step 2620.

The HO command message is transmitted from the source eNB to the UE through an RRC connection reconfiguration message and may indicate a target cell to which the UE is handed over through a target cell identifier in step 2620. Upon receiving the message, the UE stops data transmission and reception to and from the source eNB and starts a timer T304. When the handover of the UE to the target eNB is not successful for a predetermined time, T304 returns the UE to the original configuration and switches the UE to the RRC idle state.

The source eNB transmits a PDCP sequence number (or count value) status (Sequence Number (SN) status) of uplink/downlink data, and if there is downlink data, transmits the downlink data to the target eNB in steps 2630 and 2635. The UE attempts random access to the target cell instructed by the source eNB in step 2640. The random access is to inform the target cell that the UE moves through the handover and also to synchronize uplink. For the random access, the UE transmits a preamble corresponding to a preamble ID received from the source eNB or a randomly selected preamble ID to the target cell.

After transmitting the preamble, the UE monitors whether a Random Access Response (RAR) is transmitted from the target cell after a predetermined number of subframes. A time window during which monitoring is performed is referred to as a Random Access Response (RAR) window. When the RAR is received for a particular time in step 2645, the UE transmits a handover (HO) complete message, which is an RCConnectionReconfigurationComplete message, to the target eNB in step 2655.

As described above, upon successfully receiving the RAR from the target eNB, the UE terminates the timer T304 in step 2650. When the UE successfully receives the RAR before the timer expires, the UE may perform fallback and perform the random access procedure again after a predetermined time from the RRC idle mode.

In order to switch a path of bearers established in the source eNB, the target eNB makes a request for switching the path in steps 2660 and 2665, and notifies the source eNB of deletion of UE context in step 2670. Accordingly, the UE attempts data reception from the UE at a RAR window start time point, and after RAR reception, starts data transmission to the target eNB while transmitting an RRCConnectionReconfigurationComplete message.

Figure 20:
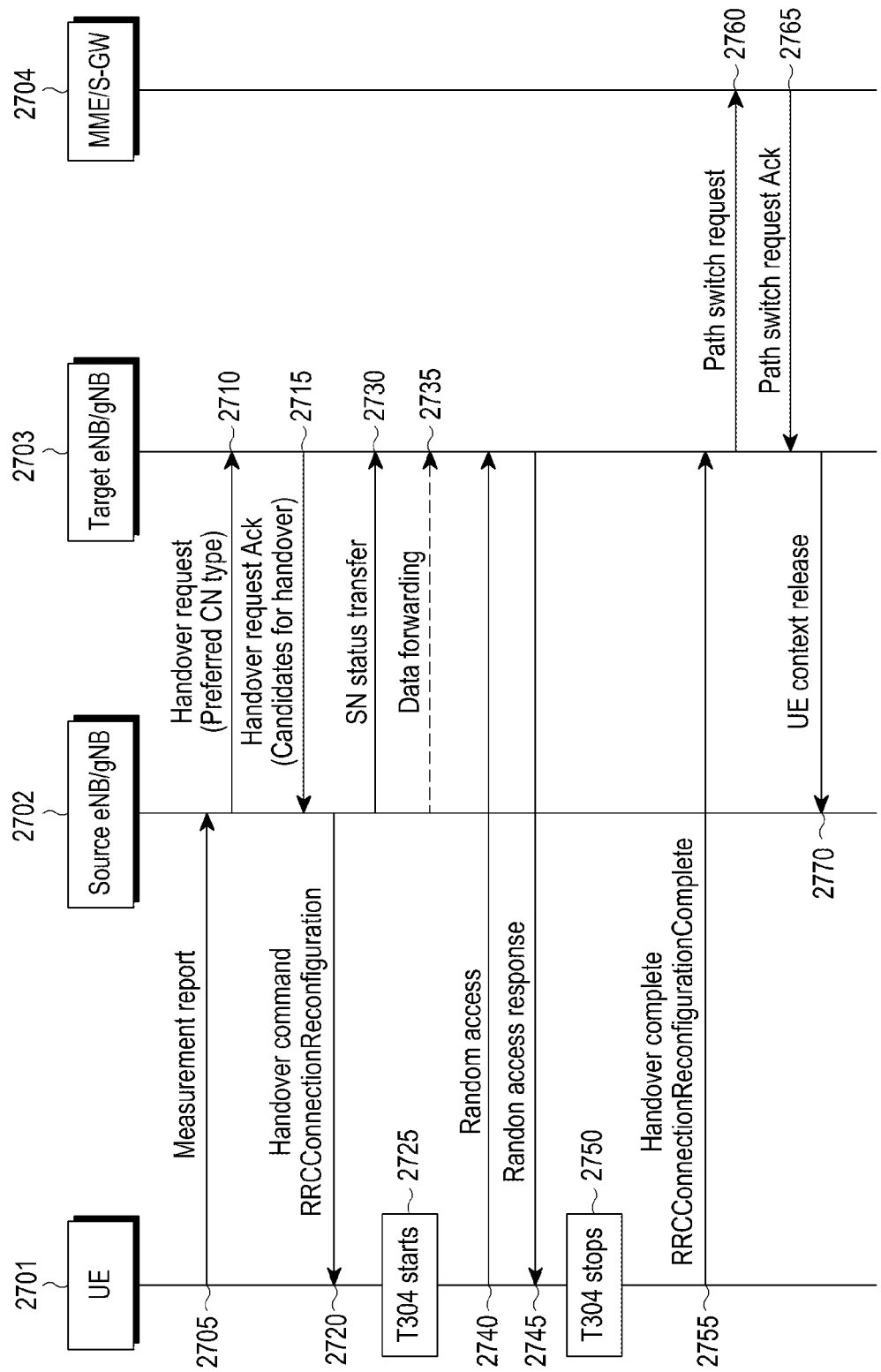
FIG. 20 illustrates a fourth embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service of the UE, or preferred by the source eNB to perform the handover.

FIG. 20 illustrates a fourth embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service of the UE, or preferred by the source eNB to perform the handover.

Referring to FIG. 20, when a periodic or a particular event is satisfied in a current source eNB 2702, a connected-mode UE 2701 performs cell measurement on the conventionally accessed cell or other cells and reports cell measurement information (measurement report) including identifier of the measured cells and the measurement result (for example, absolute or relative signal strength) to the source eNB in step 2705.

The source eNB determines whether to hand over the UE to an adjacent cell on the basis of the measurement information. The handover is technology for switching a source eNB, which provides a service to the connected-mode UE, to another eNB. When the source eNB determines to perform the handover, the source eNB transmits a handover (HO) request message to a new eNB, that is, a target eNB to provide a service to the UE and make a request for the handover in step 2710.

The handover request message may include a target cell identifier indicating a cell of the target eNB to which the UE is handed over and asks the target eNB about if the handover is possible while making a request for preparing the handover to the target cell. In the disclosure, since the source eNB can be aware of the CN type preferred by the UE like in 4g or 4h, the source eNB may reflect the CN type and transmit the handover request message including the preferred CN type (CN type preferred by the UE or suitable for the service). Further, the source eNB may ask the target eNB if the handover to the selected target cell is possible.

Uplink receiving the handover request message, the target eNB may identify whether the handover to the target cell instructed by the message is possible, identify the CN type instructed by the message, and transmit a handover response message including target cells to which the UE can be handed over in step 2715. That is, the target eNB may transmit the handover response message including information on whether the handover to the target cell selected by the source eNB is possible and cells to which the UE can be handed over among cells connected to the CN type preferred by the source eNB (or UE).

Upon receiving the handover response message, the source eNB may select a target cell suitable for the preferred CN type from among the target cells and indicate the selected target cell to the UE through a handover command message. If the target eNB cannot prepare the handover to the requested target cell in the handover request message for a predetermined reason (for example, lack of transmission resources), the target eNB may transmit a handover preparation failure message to the source eNB to reject the handover request.

The source eNB receiving the handover request acknowledgement (ack) message transmits a HO command message to the UE in step 2720. The HO command message is transmitted from the source eNB to the UE through an RRC connection reconfiguration message and may indicate a target cell to which the UE is handed over through a target cell identifier in step 2720.

Upon receiving the message, the UE stops data transmission and reception to and from the source eNB and starts a timer T304. When the handover of the UE to the target eNB is not successful for a predetermined time, T304 returns the UE to the original configuration and switches the UE to the RRC idle state. The source eNB transmits a PDCP sequence number (or count value) status (Sequence Number (SN) status) of uplink/downlink data, and if there is downlink data, transmits the downlink data to the target eNB in steps 2730 and 2735.

The UE attempts random access to the target cell instructed by the source eNB in step 2740. The random access is to inform the target cell that the UE moves through the handover and also to synchronize uplink. For the random access, the UE transmits a preamble corresponding to a preamble ID received from the source eNB or a randomly selected preamble ID to the target cell.

After transmitting the preamble, the UE monitors whether a Random Access Response (RAR) is transmitted from the target cell after a predetermined number of subframes. A time window during which monitoring is performed is referred to as a Random Access Response (RAR) window. When the RAR is received for a particular time in step 2745, the UE transmits a handover (HO) complete message, which is an RRC reconfiguration complete message, to the target eNB in step 2755.

As described above, upon successfully receiving the RAR from the target eNB, the UE terminates the timer T304 in step 2750. When the UE successfully receives the RAR before the timer expires, the UE may perform fallback and perform the random access procedure again after a predetermined time from the RRC idle mode.

In order to switch a path of bearers established in the source eNB, the target eNB makes a request for switching the path in steps 2760 and 2765, and notifies the source eNB of deletion of UE context in step 2770. Accordingly, the UE attempts data reception from the UE at a RAR window start time point, and after RAR reception, starts data transmission to the target eNB while transmitting an RRCConnectionReconfigurationComplete message.

Figures 21A, 21B:
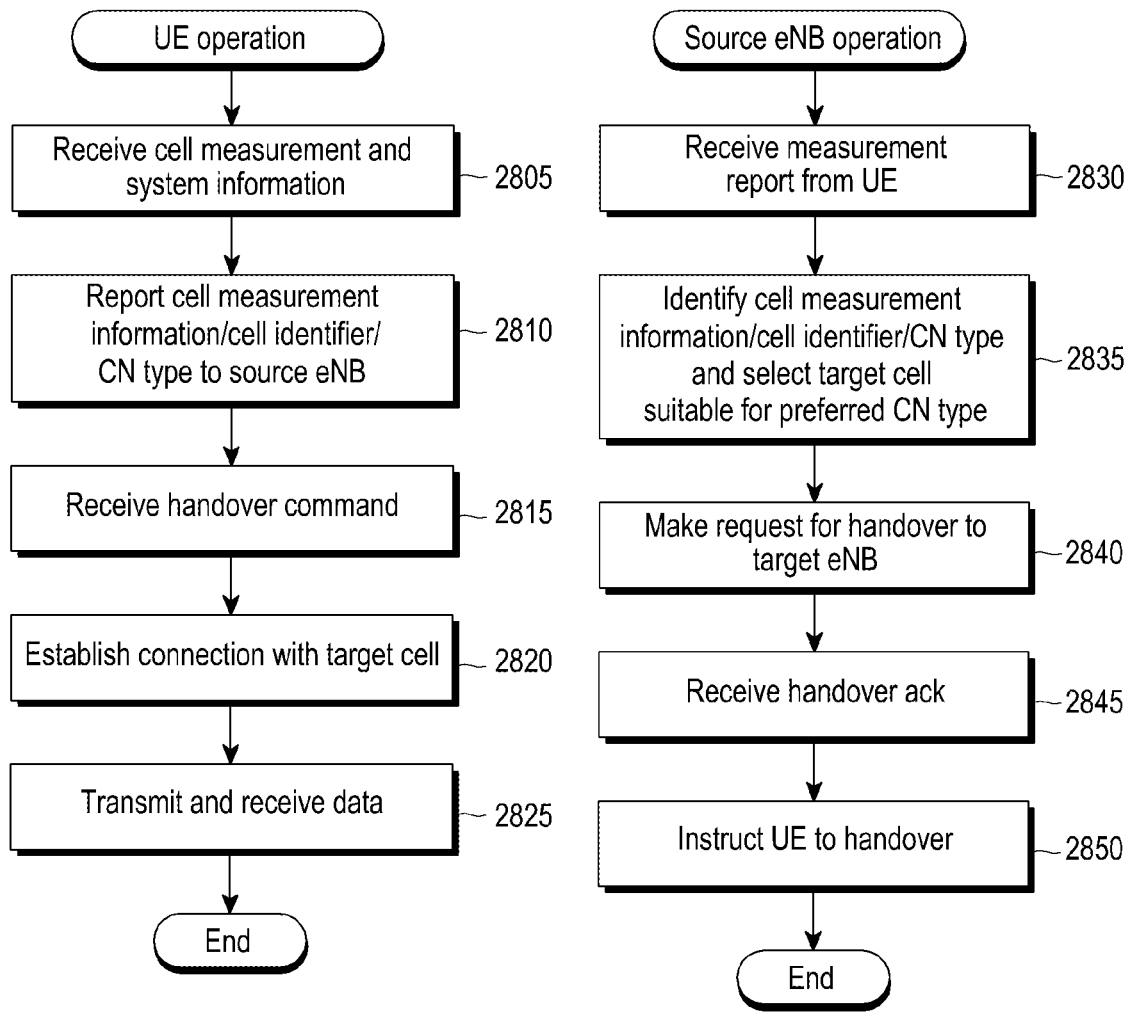
FIGS. 21A and 21B illustrate the UE operation and the eNB operation according to the second embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service of the UE, or preferred by the source eNB to perform the handover.

FIGS. 21A and 21B illustrate the UE operation and the eNB operation according to the second embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service of the UE, or preferred by the source eNB to perform the handover.

Referring to FIG. 21A, when a predetermined event or condition is satisfied, the UE performs cell measurement on neighboring cells, reads system information of the corresponding cell, and identifies a CN type in step 2805. When providing the cell measurement report, the UE provides the cell measurement report including cell measurement information, cell identifiers, and CN types to the source eNB in step 2810. Upon receiving a handover command message in step 2815, the UE establishes the connection to the target cell instructed by the message in step 2820 and transmits and receives data in step 2825.

Referring to FIG. 21B, when receiving a cell measurement result report message from the UE in step 2830, the source eNB identifies information such as cell measurement information, cell identifiers, and CN types in the message and selects a target cell corresponding to a CN type preferred in initial UE access or suitable for the current UE service in step 2835, transmits a handover request message to the target eNB in step 2840, and when receiving a handover ack message in step 2845, instructs the UE to perform handover in step 2850.

FIG. 22 illustrates the eNB operation according to the third embodiment of the disclosure in which, when the RRC-connected mode UE performs handover from a source eNB (source cell) to a target eNB (target cell) in the network, the UE selects a target cell connected to a CN type (5G CN or EPC) preferred by the UE, suitable for a service of the UE, or preferred by the source eNB to perform the handover.

Referring to FIG. 22, when receiving a cell measurement result report message from the UE in step 2905, the source eNB identifies information on target cells (cell identifier, and CN type) shared with the target eNB in X2/Xn interface configuration and establishment, selects a target cell corresponding to a CN type preferred in initial UE access or suitable for the current UE service in step 2910, transmits a handover request message to the target eNB in step 2915, and when receiving a handover ack message in step 2920, instructs the UE to perform handover in step 2925.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method by a terminal which is capable of connecting to evolved packet core (EPC) and 5G core (5GC) in a wireless communication system, the method comprising:
   receiving, on a cell of a base station, system information block (SIB) including information on a core network associated with the cell, wherein the cell is an evolved universal mobile telecommunications system terrestrial radio access (E-UTRA) cell and the core network is 5GC, and wherein the information on the core network includes a core network type;
   performing a measurement for the cell;
   generating a measurement report message for reporting a measurement result, the measurement report message including first information on a cell identifier of the cell, second information on the measured result, and third information on the core network type; and
   transmitting, to the base station, the measurement report message.

2. The method of claim 1, wherein the SIB includes a public land mobile network (PLMN) list associated with E-UTRA and 5GC.

3. The method of claim 1, wherein the measurement report message is generated, in case that a condition is satisfied.

4. The method of claim 1, further comprising:
   receiving, from the base station, a handover command message indicating a handover to a target base station from the base station which is a source base station; and
   performing a handover based on the handover command message and the result of the measurement,
   wherein the handover command message includes a selected core network type indicating one of a core network type preferred by the terminal, a core network type suitable for providing a wireless communication service to the terminal, and a core network type preferred by the base station.

5. A method for supporting a terminal which is capable of connecting to evolved packet core (EPC) and 5G core (5GC)

and performed by a base station in a wireless communication system, the method comprising:
  transmitting, to the terminal on a cell of the base station, system information block (SIB) including information on a core network associated with the cell, wherein the cell is an evolved universal mobile telecommunications system terrestrial radio access (E-UTRA) cell and the core network is 5GC, and wherein the information on the core network includes a core network type; and
  receiving, from the terminal, a measurement report message for reporting a measurement result and generated based on a measurement performed for the cell, the measurement report message including first information on a cell identifier of the cell, second information on the measurement result, and third information on the core network type.

6. The method of claim 5, wherein the SIB includes a public land mobile network (PLMN) list associated with E-UTRA and 5GC.

7. The method of claim 5, wherein the measurement report message is generated, in case that a condition is satisfied.

8. The method of claim 5, further comprising:
  transmitting, to the terminal, a handover command message including a handover to a target base station from the base station which is a source base station; and
  performing a handover for the terminal based on the handover command message and the result of the measurement, and
  wherein the handover command message includes a selected core network type indicating one of a core network type preferred by the terminal, a core network type suitable for providing a wireless communication service to the terminal, and a core network type preferred by the base station.

9. A terminal which is capable of connecting to evolved packet core (EPC) and 5G core (5GC) in a wireless communication system, the terminal comprising:
  a transceiver configured to transmit and receive a signal; and
  a controller coupled with the transceiver and configured to:
  receive, on a cell of a base station, system information block (SIB) including information on a core network associated with the cell, wherein the cell is an evolved universal mobile telecommunications system terrestrial radio access (E-UTRA) cell and the core network is 5GC, and wherein the information on the core network includes a core network type,
  perform a measurement for the cell,
  generate a measurement report message for reporting a measurement result, the measurement report message including first information on a cell identifier of the cell, second information on the measured result, and third information on the core network type, and
  transmit, to the base station, the measurement report message.

10. The terminal of claim 9, wherein the SIB includes a public land mobile network (PLMN) list associated with E-UTRA and 5GC.

11. The terminal of claim 9, wherein the measurement report message is generated, in case that a condition is satisfied.

12. The terminal of claim 9, wherein the controller is further configured to:
  receive, from the base station, a handover command message indicating a handover to a target base station from the base station which is a source base station, and
  perform a handover based on the handover command message and the result of the measurement, and
  wherein the handover command message includes a selected core network type indicating one of a core network type preferred by the terminal, a core network type suitable for providing a wireless communication service to the terminal, and a core network type preferred by the base station.

13. A base station for supporting a terminal which is capable of connecting to evolved packet core (EPC) and 5G core (5GC) in a wireless communication system, the base station comprising:
  a transceiver configured to transmit and receive a signal; and
  a controller coupled with the transceiver and configured to:
  transmit, to the terminal on a cell of the base station, system information block (SIB) including information on a core network associated with the cell, wherein the cell is an evolved universal mobile telecommunications system terrestrial radio access (E-UTRA) cell and the core network is 5GC, and wherein the information on the core network includes a core network type, and
  receive, from the terminal, a measurement report message for reporting a measurement result and generated based on a measurement performed for the cell, the measurement report message including first information on a cell identifier of the cell, second information on the measurement result, and third information on the core network type.

14. The base station of claim 13, wherein the SIB includes a public land mobile network (PLMN) list associated with E-UTRA and 5GC.

15. The base station of claim 13, wherein the measurement report message is generated, in case that a condition is satisfied.

16. The base station of claim 13, wherein the controller is further configured to:
  transmit, to the terminal, a handover command message including a handover to a target base station from the base station which is a source base station, and
  perform a handover for the terminal based on the handover command message and the result of the measurement, and
  wherein the handover command message includes a selected core network type indicating one of a core network type preferred by the terminal, a core network type suitable for providing a wireless communication service to the terminal, and a core network type preferred by the base station.

* * * * *